US012694606B2

(12) United States Patent (10) Patent No.:  US 12,694,606 B2
Fujisawa (45) Date of Patent:      Jul. 28, 2026

(54) NON-TRANSITORY COMPUTER-READABLE MEDIUM, IMAGE PROCESSING SYSTEM, IMAGE PROCESSING METHOD, AND IMAGE PROCESSING APPARATUS

(71) Applicant: Nintendo Co., Ltd., Kyoto (JP)

(72) Inventor: Yasuhito Fujisawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 121 days.

(21) Appl. No.: 18/883,392

(22) Filed: Sep. 12, 2024

(65) Prior Publication Data

US 2025/0245907 A1      Jul. 31, 2025

(30) Foreign Application Priority Data

| Jan. 30, 2024 | (JP) | ................................. 2024-011579 |
| Jan. 30, 2024 | (JP) | ................................. 2024-011580 |
| Jan. 30, 2024 | (JP) | ................................. 2024-011581 |

(51) Int. Cl.
 *G06T 15/10*          (2011.01)
 *A63F 13/52*          (2014.01)
         (Continued)

(52) U.S. Cl.
 CPC .............. *G06T 15/10* (2013.01); *A63F 13/52* (2014.09); *A63F 13/577* (2014.09); *G06T 7/50* (2017.01);
         (Continued)

(58) Field of Classification Search
 CPC ..... G06T 15/04; G06T 15/06; G06T 2210/21; G06T 15/10; A63F 13/577; A63F 13/52
 See application file for complete search history.

(56) References Cited

U.S. PATENT DOCUMENTS

| 6,862,025 B2 * | 3/2005 | Buehler ................ G06T 15/405 |
| | | 345/426 |
| 2016/0027203 A1 * | 1/2016 | Lee ......................... G06T 15/06 |
| | | 345/423 |

(Continued)

FOREIGN PATENT DOCUMENTS

| GB | 2596566 | 1/2022 |
| JP | 08-123835 | 5/1996 |

(Continued)

OTHER PUBLICATIONS

"Screen Space Reflection", Unity Technologies, searched on Dec. 20, 2023, 1 page, https://docs.unity3d.com/ja/2019.4/Manual/PostProcessing-ScreenSpaceReflection.html.

(Continued)

*Primary Examiner* — Daniel F Hajnik
*Assistant Examiner* — Joshua Jungwook Suo
(74) *Attorney, Agent, or Firm* — Nixon & Vanderhye PC

(57)          ABSTRACT

An image processing system according to an exemplary embodiment renders objects in a virtual space in a frame buffer, and with a direction from a virtual camera to a position in the virtual space relating to a pixel of interest in a drawn image as an incidence direction, calculates a reflection direction based on the incidence direction and a normal direction. The image processing system calculates as a ray tracing direction a direction obtained by making a correction toward an inside of a screen in the calculated reflection direction, traces a ray along the ray tracing direction, and adds a color of a collision position of the ray to a color of the pixel of interest.

25 Claims, 17 Drawing Sheets

FIRST DEPTH BUFFER

(51) Int. Cl.
*A63F 13/577* (2014.01)
*G06T 7/50* (2017.01)
*G06T 15/04* (2011.01)
*G06T 15/06* (2011.01)

(52) U.S. Cl.
CPC .............. *G06T 15/04* (2013.01); *G06T 15/06* (2013.01); *G06T 2210/21* (2013.01)

(56) References Cited

U.S. PATENT DOCUMENTS

| | | | |
|---|---|---|---|
| 2020/0051313 A1 | 2/2020 | Uludag | |
| 2020/0051315 A1* | 2/2020 | Laine ................... | G06T 17/005 |
| 2021/0193083 A1 | 6/2021 | Suzuoki et al. | |

FOREIGN PATENT DOCUMENTS

| | | |
|---|---|---|
| KR | 102261250 | 6/2021 |
| WO | 2018/015716 | 1/2018 |
| WO | 2019/123547 | 6/2019 |

OTHER PUBLICATIONS

Fujisawa, U.S. Appl. No. 18/883,274, filed Sep. 12, 2024.
Fujisawa, U.S. Appl. No. 18/883,406, filed Sep. 12, 2024.
Jun. 3, 2025 Notice of Allowance issued in Japanese Patent Application No. 2024-011579, pp. 1-3.
English translation of Jun. 3, 2025 Notice of Allowance issued in Japanese Patent Application No. 2024-011579.
Morgan McGuire et al., "Efficient GPU Screen-Space Ray Tracing", the Journal of Computer Graphics Techniques [online], 2014, pp. 73-85, https://jcgt.org/published/0003/04/04/paper.pdf [Retrieved on Nov. 17, 2025].
Morgan McGuire, "Screen Space Ray Tracing", casual effects [online], Aug. 9, 2014, https://casual-effects.blogspot.com/2014/08/screen-space-ray-tracing.html [Retrieved on Nov. 17, 2025].
Voicu Popescu et al., "Reflected-Scene Impostors for Realistic Reflections at Interactive Rates", Computer Graphics Forum, Sep. 2006, vol. 25, No. 3, pp. 313-322, DOI:10.1111/j.1467-8659.2006.00950.x.
Dominic. BW, "Exclude Objects from SSR Reflection", Unreal Engine Forum [online], Aug. 2019, https://forums.unrealengine.com/t/exclude-objects-from-ssr-reflection/127053/10 [Retrieved on Nov. 17, 2025].
Unity, "Screen Space Reflection", Unity Manual-Graphics-Graphics Overview-Post-processing overview-Post-processing stack-Ambient Occlusion [online], May 24, 2017, 'https://docs.unity3d.com/560/Documentation/Manual/PostProcessing-ScreenSpaceReflection.html [Retrieved on Nov. 17, 2025].
Chalmers University of Technology, "Screen-space Reflections", Wayback Machine [online], May 8, 2020, https://web.archive.org/web/20200508174836/https://www.cse.chalmers.se/edu/year/2018/course/TDA361/Advanced%20Computer%20Graphics/Screen-space%20reflections.pdf [Retrieved on Nov. 17, 2025].

* cited by examiner

F I G .  1
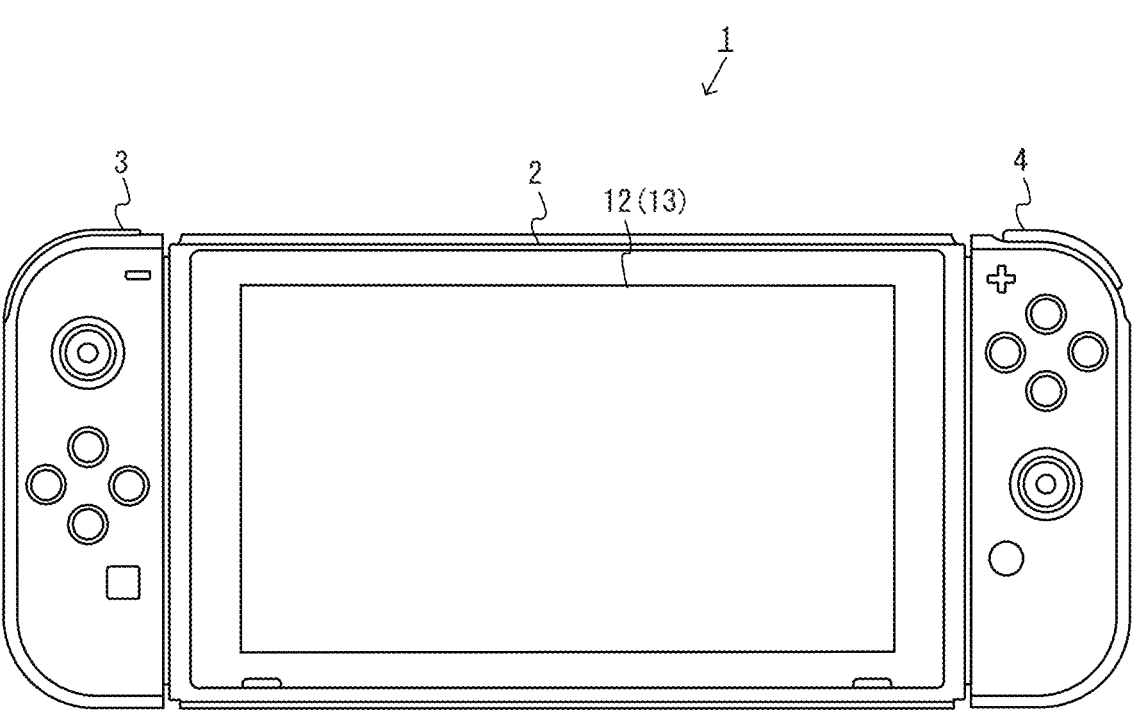

F I G. 2
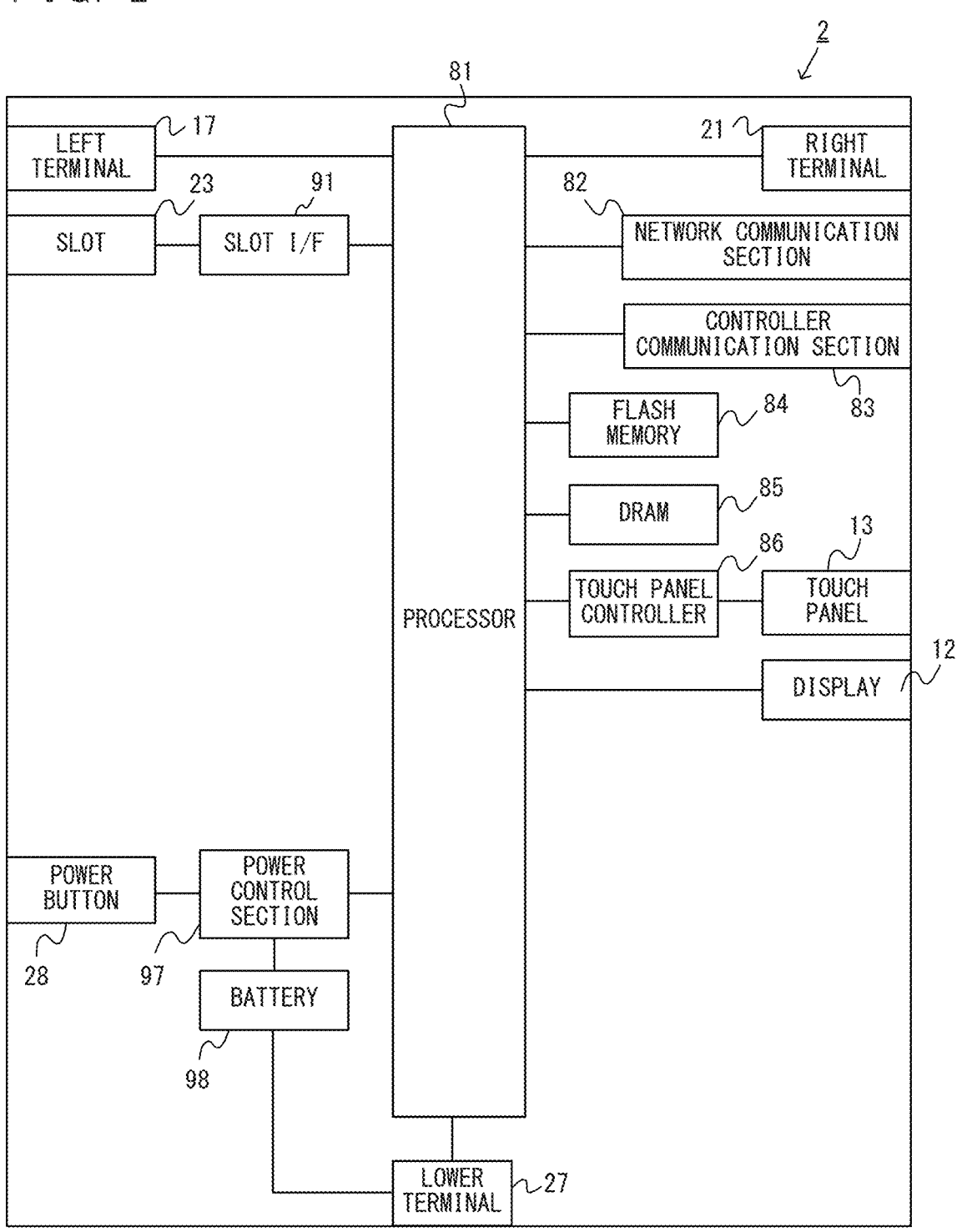

F I G. 3
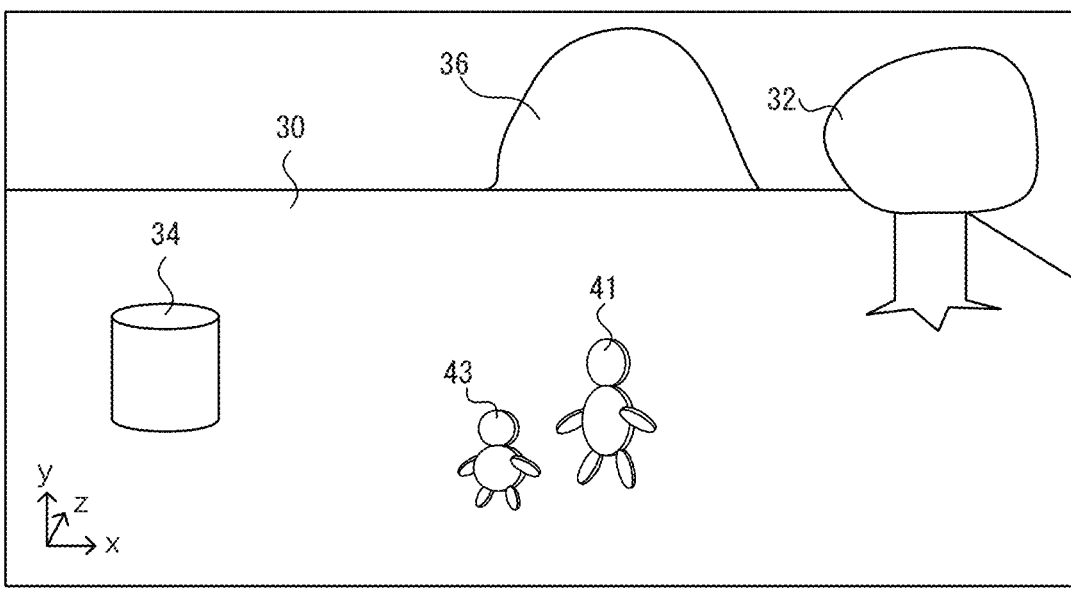
F I G. 4
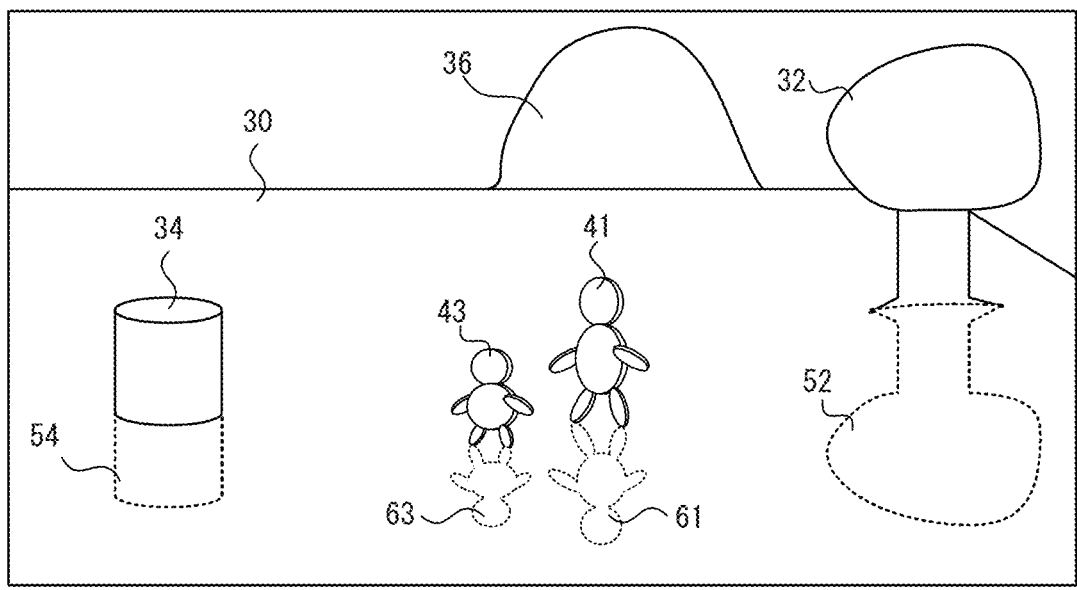

F I G . 5
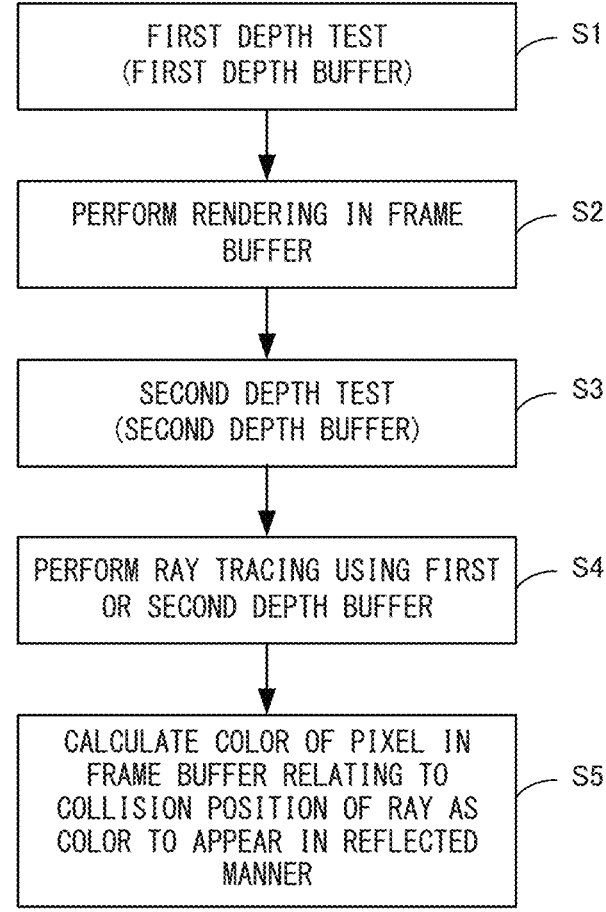

F I G. 6
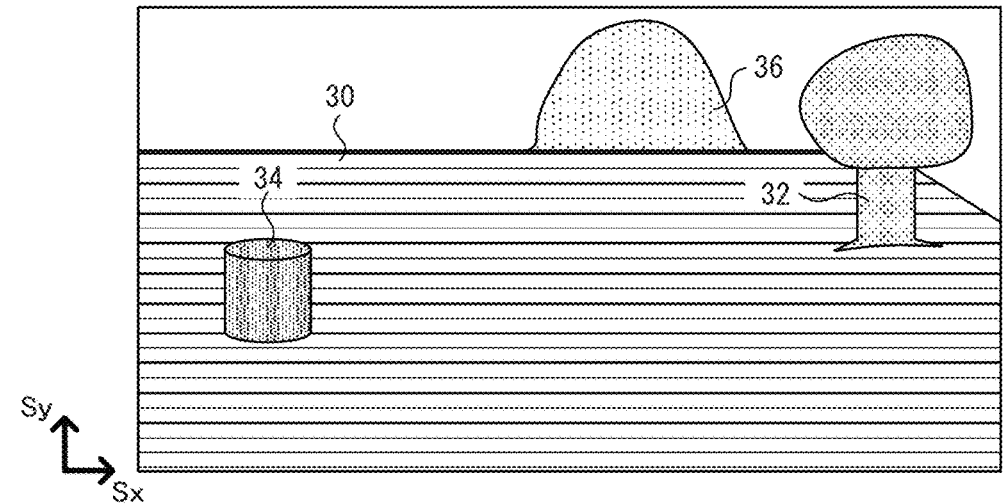
F I G. 7
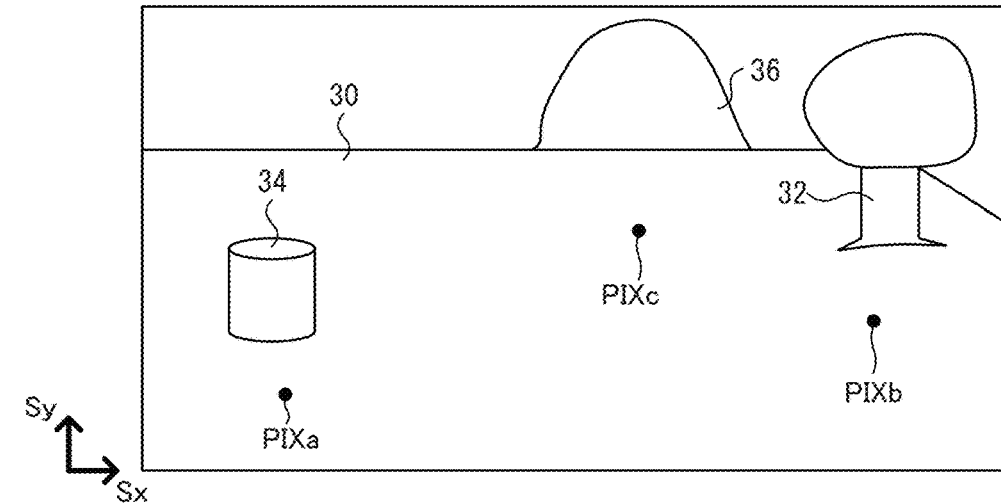
F I G. 8
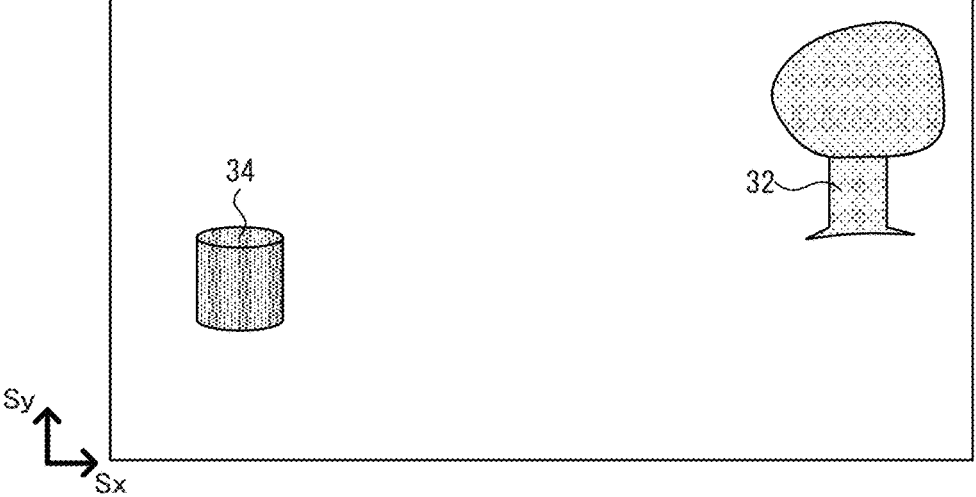

F I G. 9
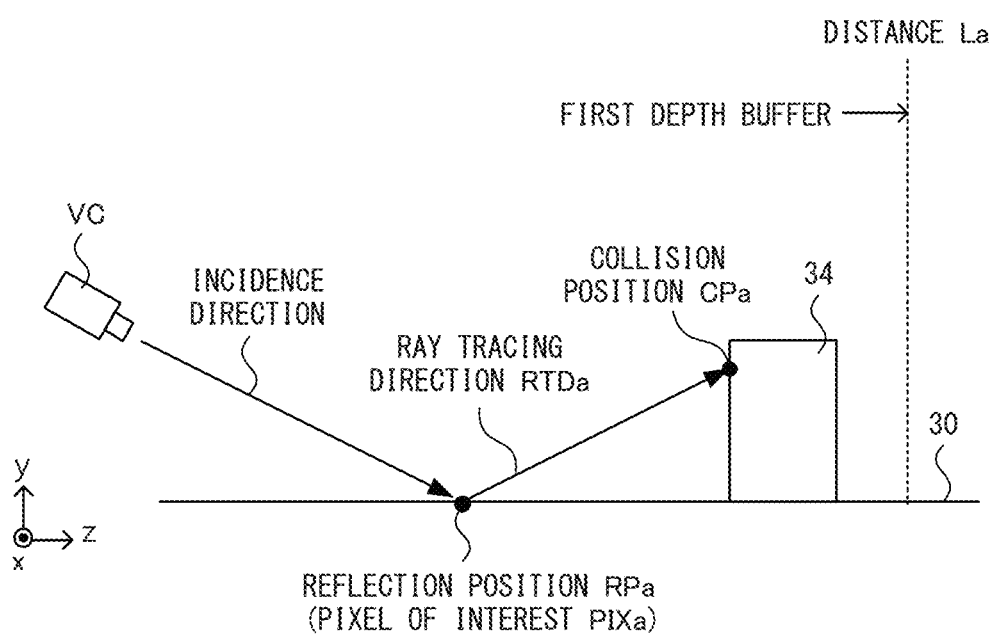
F I G. 10
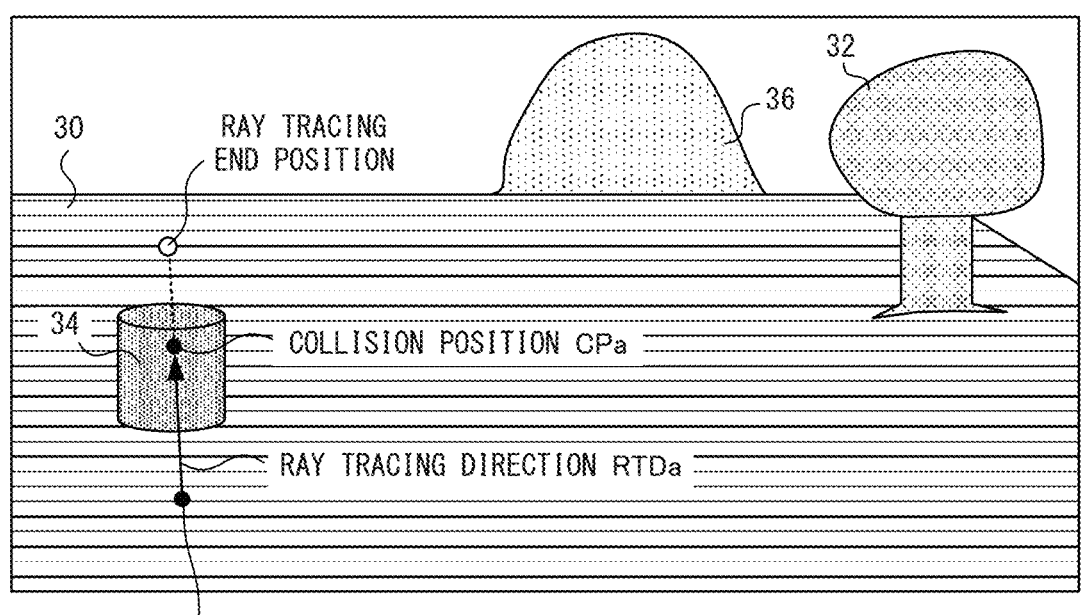

F I G.  1 1
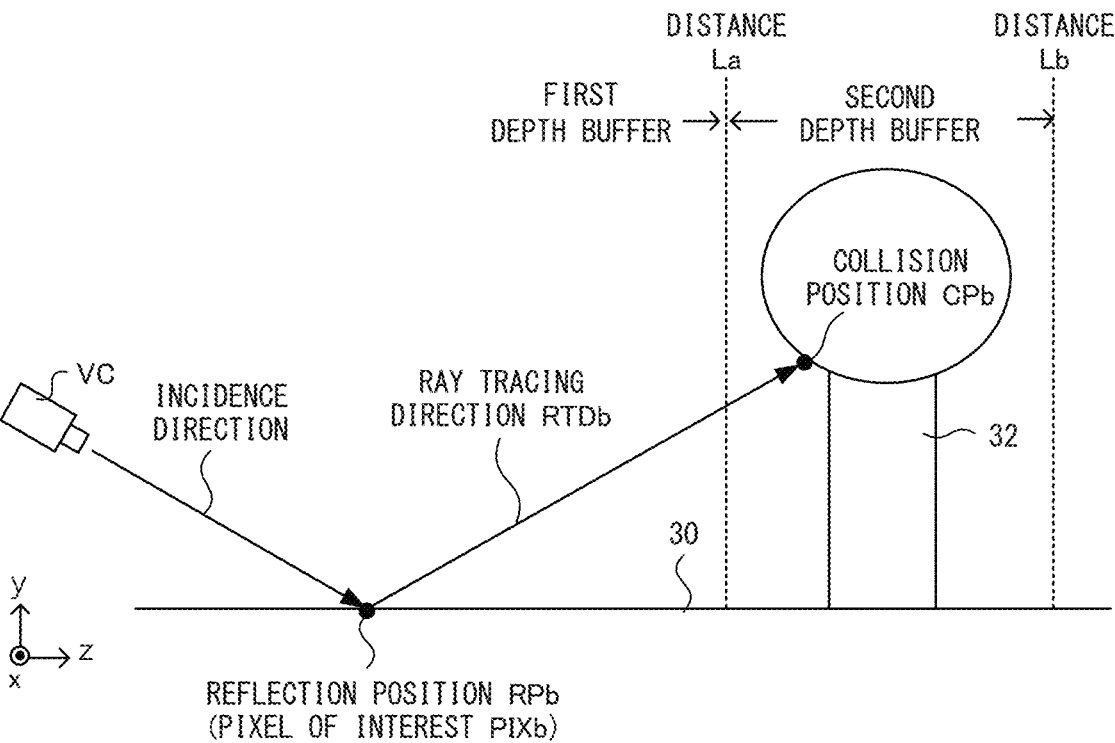
F I G.  1 2
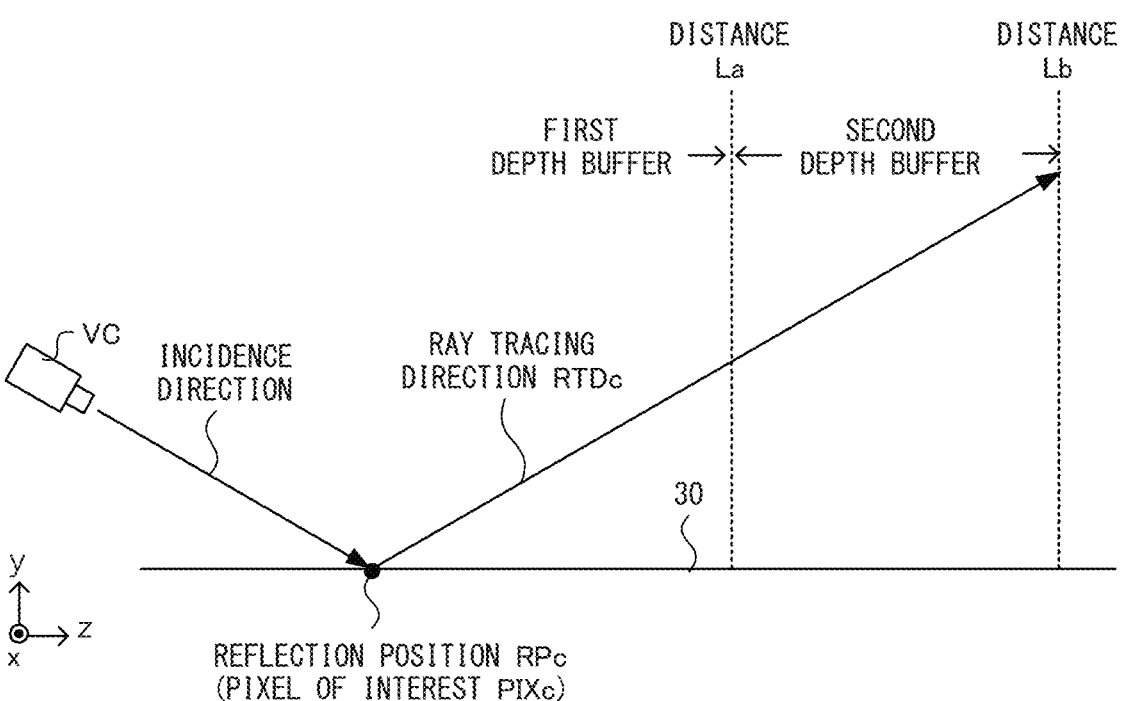

SECOND DEPTH BUFFER

FRAME BUFFER

F I G. 1 5
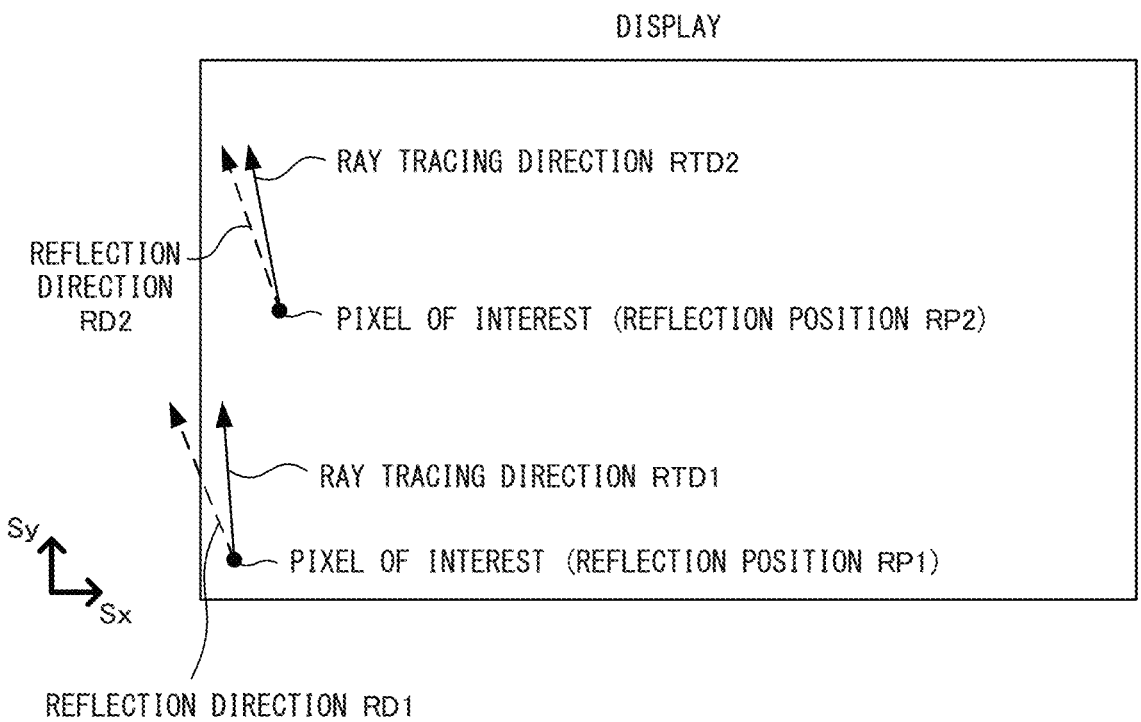
F I G. 1 6
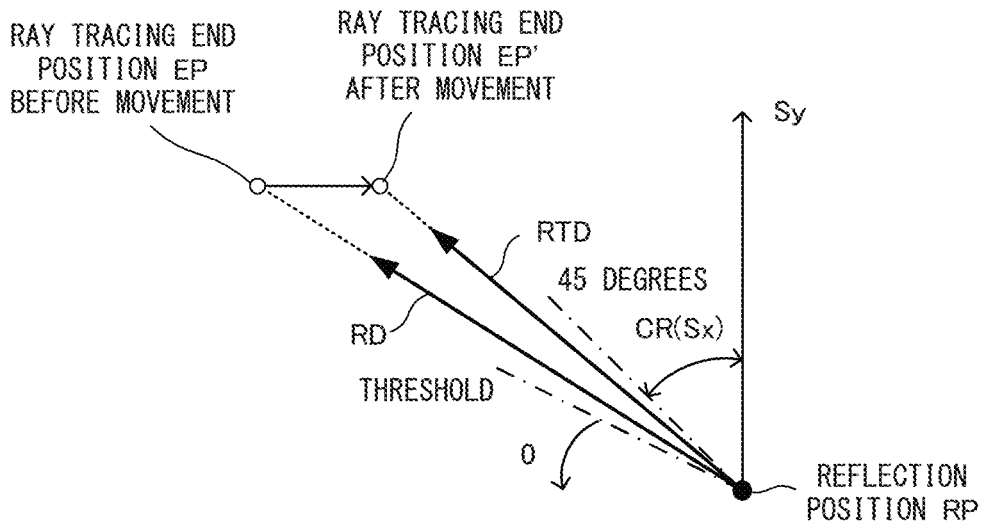

F I G .  1 9
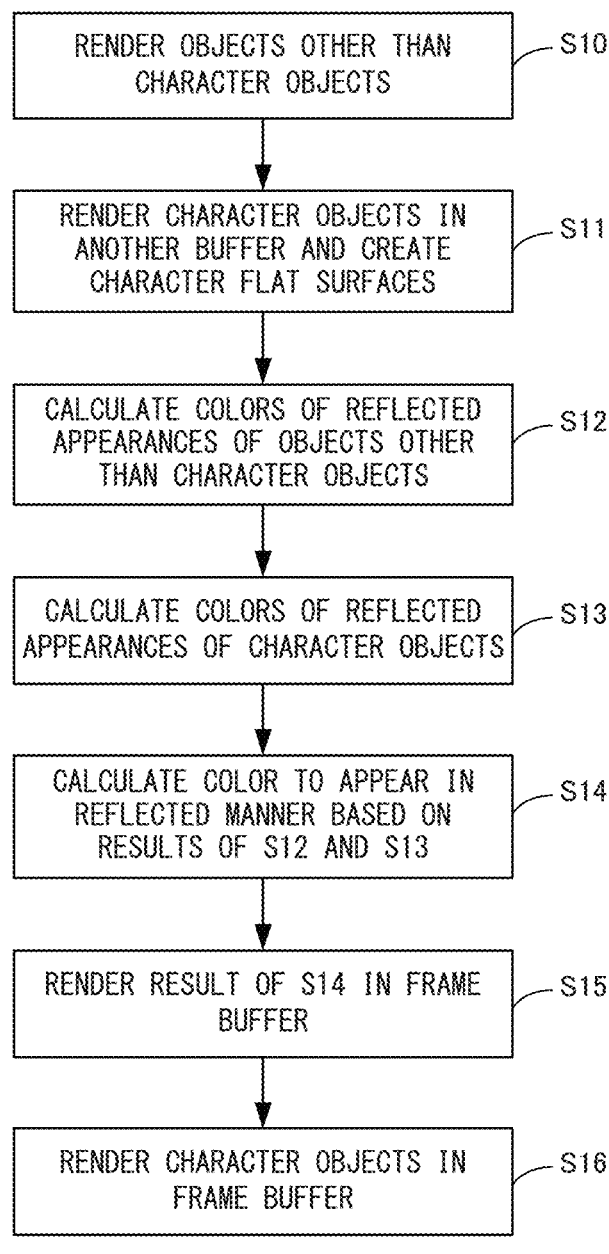

F I G . 2 0
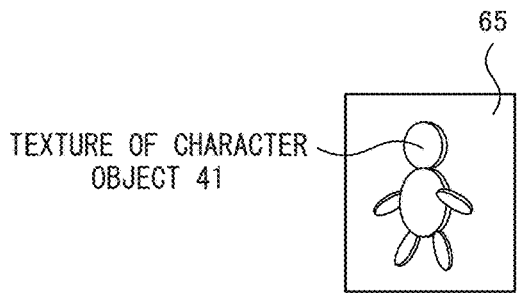
TEXTURE OF CHARACTER
OBJECT 41
F I G . 2 1
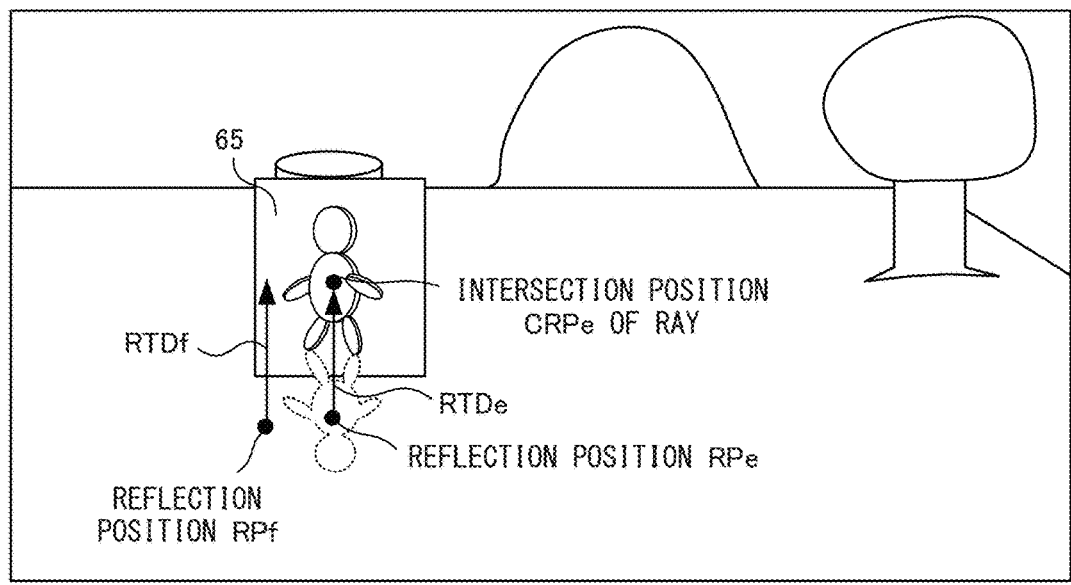
F I G . 2 2
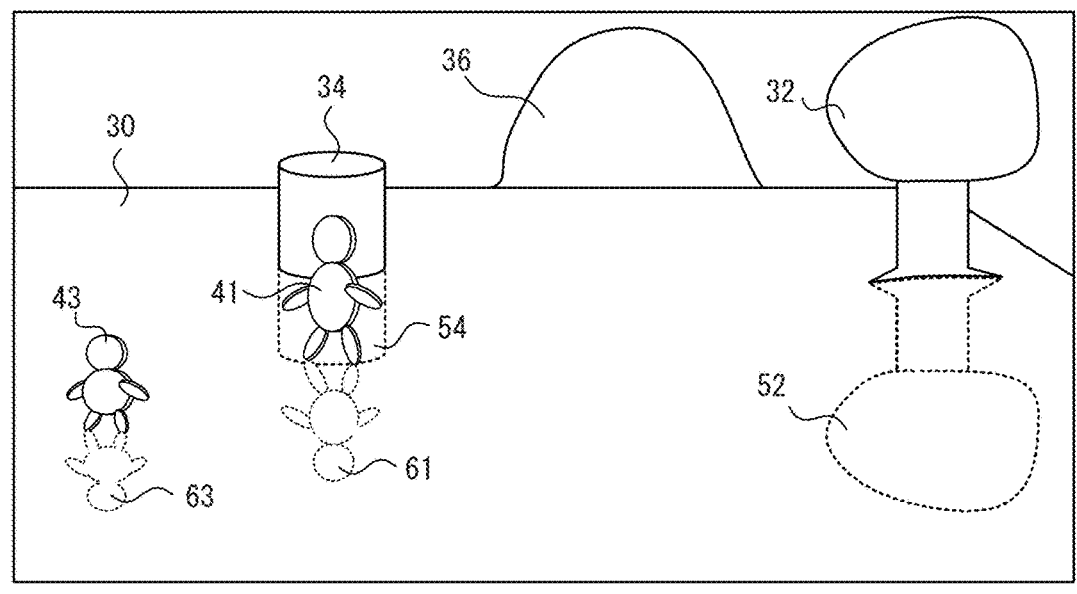

Figure 2:
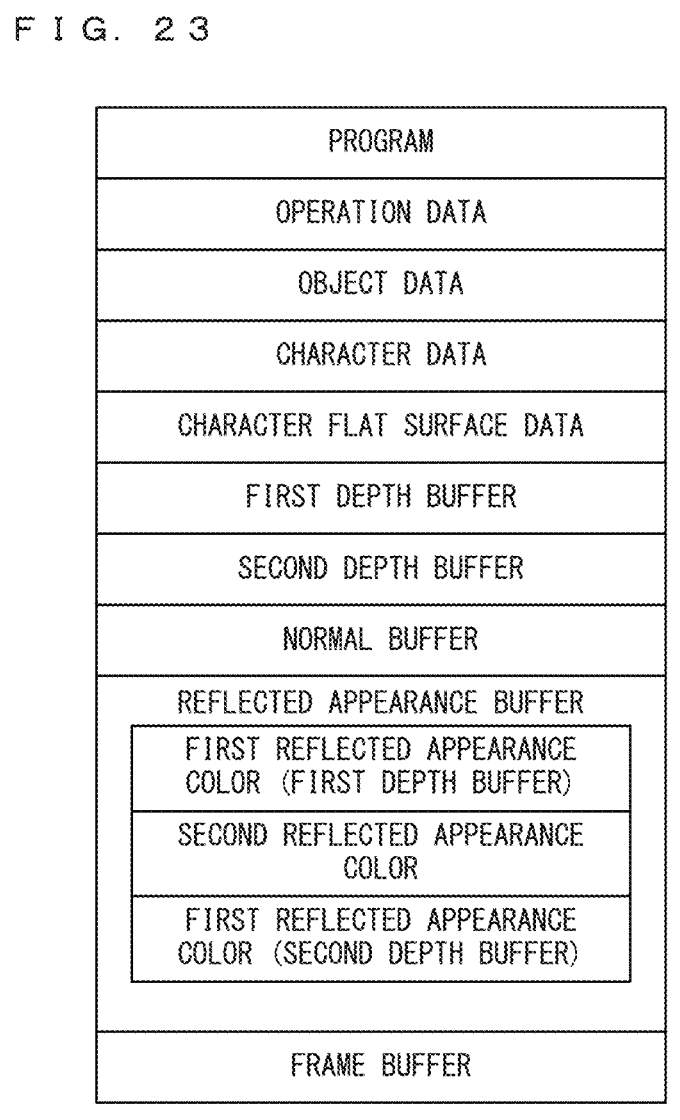

F I G.  2 3

| PROGRAM |
| OPERATION DATA |
| OBJECT DATA |
| CHARACTER DATA |
| CHARACTER FLAT SURFACE DATA |
| FIRST DEPTH BUFFER |
| SECOND DEPTH BUFFER |
| NORMAL BUFFER |

REFLECTED APPEARANCE BUFFER

| FIRST REFLECTED APPEARANCE COLOR (FIRST DEPTH BUFFER) |
| SECOND REFLECTED APPEARANCE COLOR |
| FIRST REFLECTED APPEARANCE COLOR (SECOND DEPTH BUFFER) |

| FRAME BUFFER |

F I G .  2 4
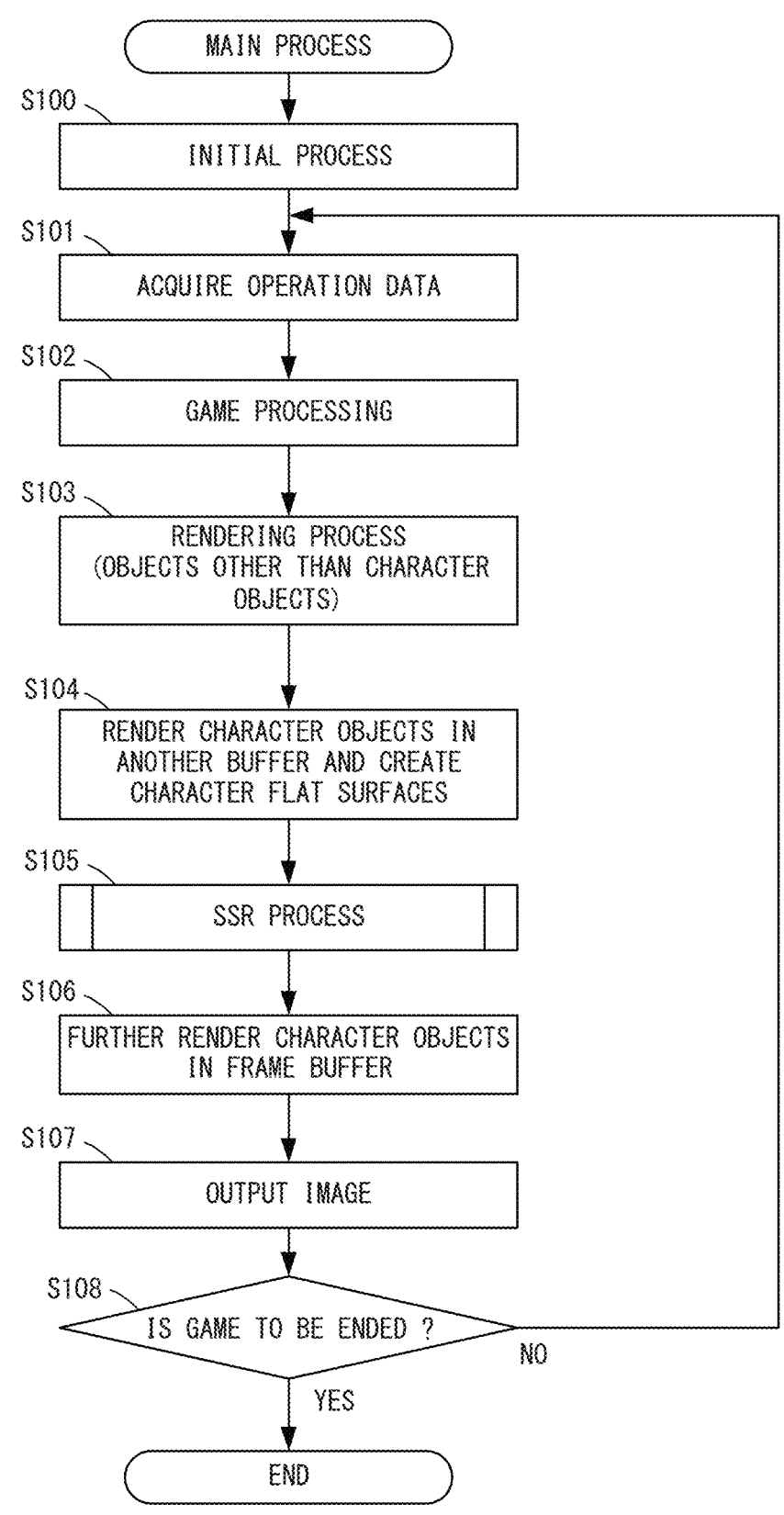

F I G. 2 5
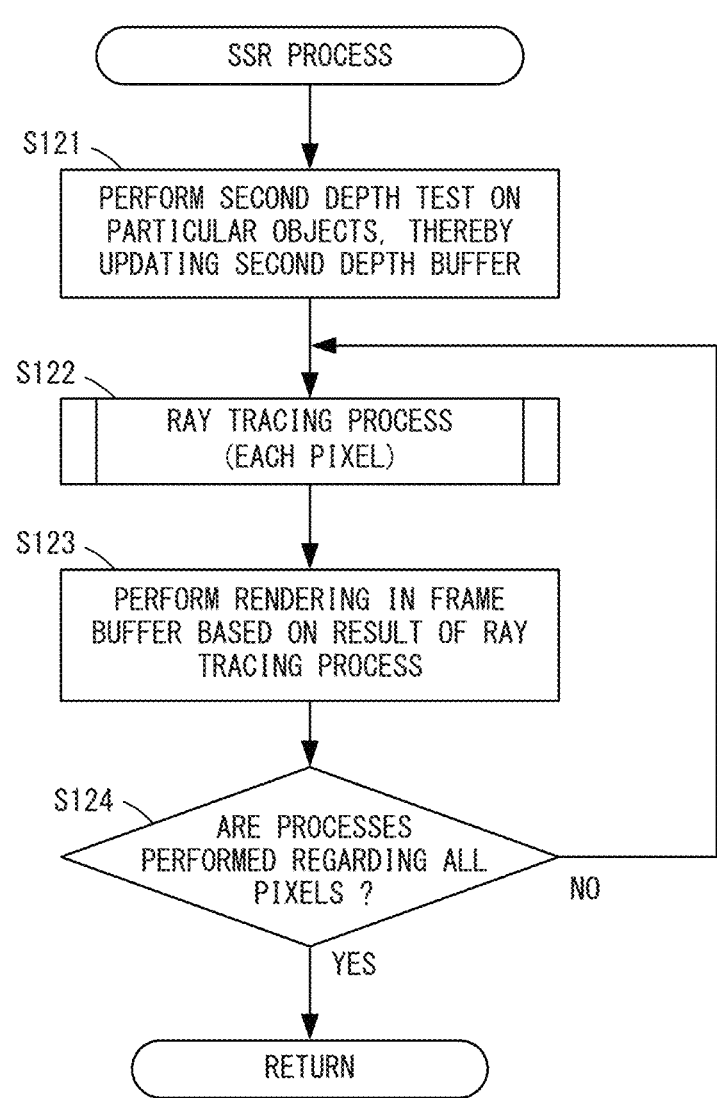

F I G. 2 6
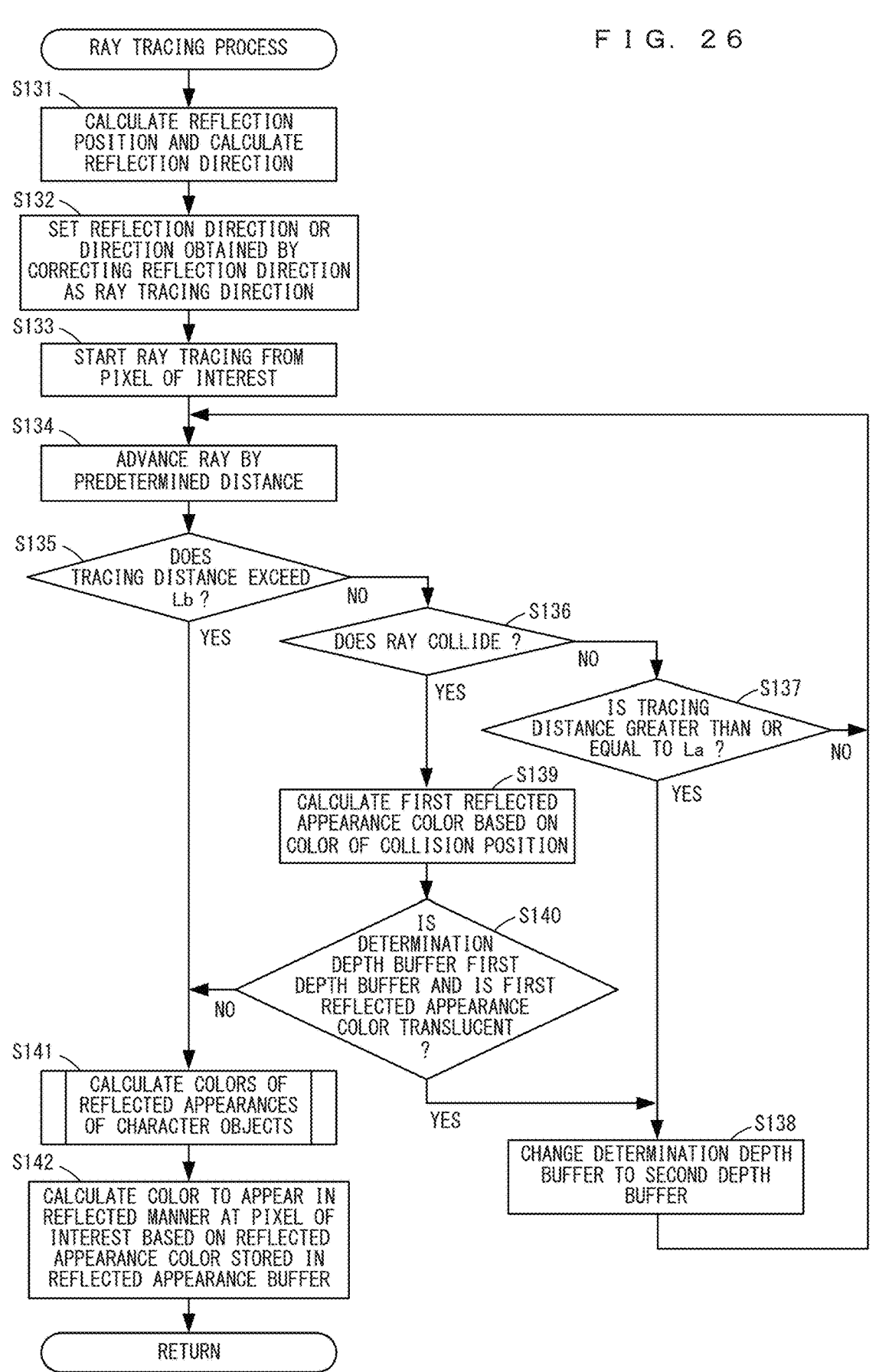

F I G. 2 7
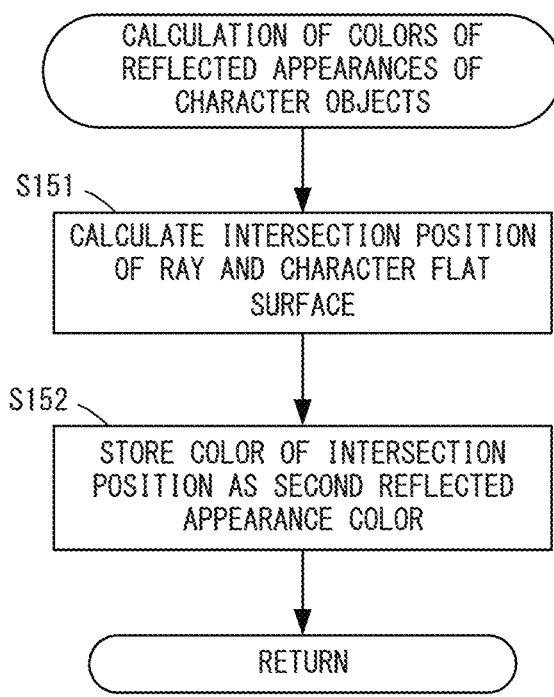

NON-TRANSITORY COMPUTER-READABLE MEDIUM, IMAGE PROCESSING SYSTEM, IMAGE PROCESSING METHOD, AND IMAGE PROCESSING APPARATUS

CROSS REFERENCE TO RELATED APPLICATION

This application claims priority to Japanese Patent Applications No. 2024-011579, No. 2024-011580, and No. 2024-011581 filed on Jan. 30, 2024, the entire contents of which are incorporated herein by reference.

FIELD

An exemplary embodiment relates to a non-transitory computer-readable medium having stored therein an image processing program capable of representing reflection based on a drawn image, an image processing system, an image processing method, and an image processing apparatus.

BACKGROUND AND SUMMARY

Conventionally, there is a method for representing reflection by performing processing on a drawn image.

Since the above technique is processing on a drawn image, for example, a reflected appearance may be interrupted near an end of a screen.

Therefore, an exemplary embodiment discloses an image processing program capable of displaying a reflected appearance even near an end of a screen, an image processing system, an image processing method, and an image processing apparatus.

To achieve the above object, the exemplary embodiment employs the following configurations.

(First Configuration)

Instructions according to a first configuration, when executed, cause one or more processors of an information processing apparatus to execute image processing including: regarding objects in a virtual space, performing a first depth test using a first depth buffer and updating the first depth buffer; and performing drawing in a frame buffer based on a result of the first depth test. The image processing further includes, with respect to each pixel of the frame buffer in which the drawing is performed, using the pixel as a pixel of interest, based on a depth of the first depth buffer, calculating a direction from a virtual camera to a position in the virtual space relating to the pixel of interest as an incidence direction, and calculating as a ray tracing direction a direction obtained by, with the position as a reflection position, further making a correction toward an inside of a screen in a reflection direction based on the incidence direction and a direction normal to the reflection position; tracing a ray along the ray tracing direction, and based on the first depth buffer, determining a collision position where the ray collides with an object in the virtual space; and if the collision position is determined in a range where the tracing distance of the ray is less than or equal to a first distance, determining a color based on a color of a pixel in the frame buffer relating to the collision position as a reflected appearance color to be added to a color of the pixel of interest.

Based on the above, it is possible to perform ray tracing in a drawn image, and it is possible to determine a reflected appearance color based on a drawn pixel even near an end of a screen.

(Second Configuration)

According to a second configuration, in the first configuration, the correction may be a correction for, with a position at a second distance in the ray tracing direction from the reflection position as a terminal position, moving screen coordinates of the terminal position toward the inside of the screen.

Based on the above, a correction for moving a terminal position is made, whereby it is possible to calculate a ray tracing direction.

(Third Configuration)

According to a third configuration, in the second configuration, the second distance may be the first distance.

Based on the above, a correction for, with a position obtained by advancing a ray by the maximum distance in a reflection direction as the terminal position, moving the terminal position is made, whereby it is possible to calculate the ray tracing direction.

(Fourth Configuration)

According to a fourth configuration, any of the first to third configurations, the correction may be a correction for moving the screen coordinates of the terminal position close to screen coordinates of the reflection position at a level.

Based on the above, the screen coordinates of the terminal position are brought close to the screen coordinates of a reflection position, whereby, for example, it is possible to bring the ray tracing direction close to a direction along the end of the screen.

(Fifth Configuration)

According to a fifth configuration, in the fourth configuration, the closer to an end of the screen the screen coordinates of the reflection position may be, the higher the level may be.

Based on the above, the closer to the end of the screen the screen coordinates are, the higher the correction level is. Thus, it is possible to make it easy to include the collision position of the ray within the range of the drawn image.

(Sixth Configuration)

According to a sixth configuration, in any of the first to fourth configurations, the correction may be a correction made only if the screen coordinates of the reflection position are included in a predetermined range close to an end of the screen.

Based on the above, it is possible to make a correction only in a range close to the end of the screen, and it is possible to avoid an unnatural reflected appearance.

(Seventh Configuration)

According to a seventh configuration, in any of the first to fourth configurations, the correction may be a correction made only if the reflection direction is directed to an outside of the screen.

Based on the above, if a reflection direction is directed to the inside of the screen, a correction is not made. Thus, it is possible to avoid an unnatural reflected appearance.

(Eighth Configuration)

According to an eighth configuration, in any of the first to seventh configurations, the correction may be made regarding only a component in a left-right direction of the screen coordinates.

Based on the above, for example, it is possible to make a correction suitable for a game where a virtual space spreads in a horizontal direction or the like.

Another exemplary embodiment may be an image processing system that performs the above image processing, or may be an image processing apparatus, or may be an image processing method.

According to the exemplary embodiment, it is possible to determine a reflected appearance color based on a drawn pixel even near an end of a screen.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is an example non-limiting diagram showing an example of the state where a left controller 3 and a right controller 4 are attached to a main body apparatus 2;

FIG. 2 is an example non-limiting block diagram showing an example of the internal configuration of the main body apparatus 2;

FIG. 3 is an example non-limiting diagram showing examples of a plurality of objects placed in a virtual space during the execution of a game according to an exemplary embodiment;

FIG. 4 is an example non-limiting diagram showing an example of a game image displayed on a display apparatus;

FIG. 5 is an example non-limiting diagram showing an overview of image processing regarding the reflected appearances of objects other than character objects;

FIG. 6 is an example non-limiting diagram showing an example of a first depth buffer;

FIG. 7 is an example non-limiting diagram showing an example of an image drawn in a frame buffer after rendering in step S2 is performed;

FIG. 8 is an example non-limiting diagram showing an example of a second depth buffer;

FIG. 9 is an example non-limiting diagram showing the state where ray tracing is performed, and is an example non-limiting diagram showing the state where a ray reflected from a reflection position RPa collides with a cylinder object 34;

FIG. 10 is an example non-limiting diagram showing the state where a collision determination regarding the ray reflected from the reflection position RPa is made using the first depth buffer;

FIG. 11 is an example non-limiting diagram showing the state where ray tracing is performed, and is an example non-limiting diagram showing the state where a ray reflected from a reflection position RPb collides with a tree object 32;

FIG. 12 is an example non-limiting diagram showing the state where ray tracing is performed, and is an example non-limiting diagram showing the state where a ray reflected from a reflection position RPc does not collide with an object;

FIG. 15 is an example non-limiting diagram showing an example of a ray tracing direction obtained by correcting a reflection direction;

FIG. 16 is an example non-limiting diagram illustrating the details of the correction of a reflection direction;

FIG. 19 is an example non-limiting diagram showing an overview of image processing for generating the reflected appearances of a character object and an object present on the far side of the character object;

FIG. 20 is an example non-limiting diagram showing an example of character flat surfaces created in step S11;

FIG. 21 is an example non-limiting diagram illustrating the calculation of the colors of the reflected appearances of character objects in step S13;

FIG. 22 is an example non-limiting diagram showing an example of a game image displayed in a case where the image processing in FIG. 19 is performed;

FIG. 23 is an example non-limiting diagram showing an example of data stored in a memory of the main body apparatus 2;

FIG. 24 is an example non-limiting flow chart showing an example of a main process executed by a processor 81 of the main body apparatus 2;

FIG. 25 is an example non-limiting flow chart showing an example of an SSR process in step S105;

FIG. 26 is an example non-limiting flow chart showing an example of a ray tracing process in step S122; and FIG. 27 is an example non-limiting flow chart showing an example of a calculation process for calculating the colors of the reflected appearances of character objects in step S141.

Figure 13:
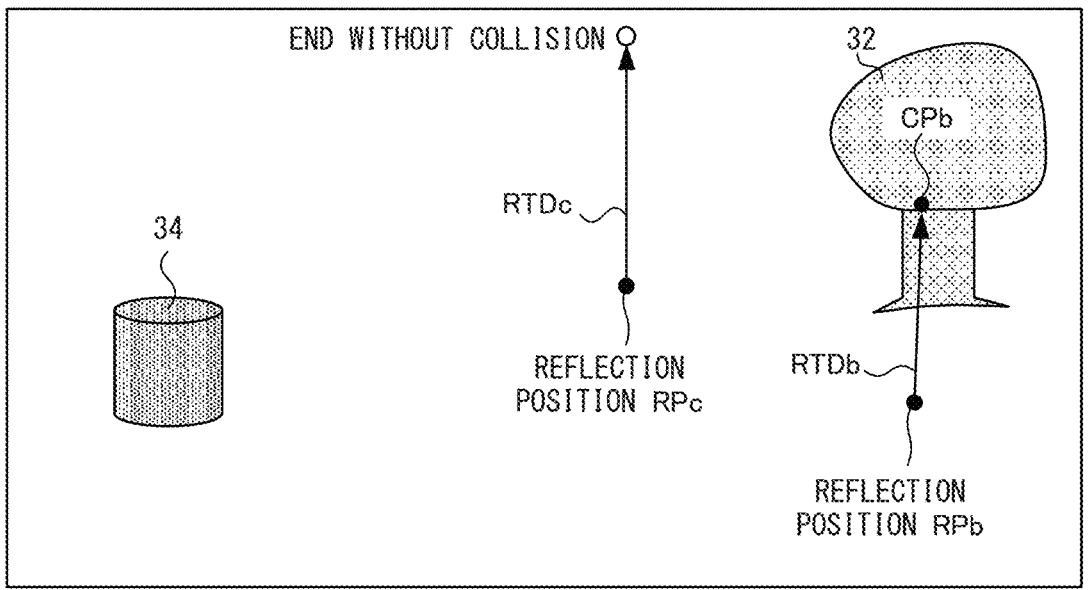
FIG. 13 is an example non-limiting diagram showing the state where a collision determination regarding a ray is made using the second depth buffer.

DETAILED DESCRIPTION OF NON-LIMITING EXAMPLE EMBODIMENTS (System Configuration)

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. Hereinafter, first, the hardware configuration of the game system 1 according to the exemplary embodiment is described, and then, the control of the game system 1 according to the exemplary embodiment is described.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

The left controller 3 and the right controller 4 are attachable to and detachable from the main body apparatus 2. It should be noted that hereinafter, the left controller 3 and the right controller 4 will occasionally be referred to collectively as a "controller".

The main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

FIG. 2 is a block diagram showing an example of the internal configuration of the main body apparatus 2.

The main body apparatus 2 includes a processor 81. The processor 81 is an information processing section for executing various types of information processing to be executed by the main body apparatus 2. The processor 81 includes one or more CPUs (Central Processing Units) and one or more GPUs (Graphics Processing Units). The processor 81 may be composed of an SoC (system-on-a-chip) having a plurality of functions such as a CPU function and a GPU function. It should be noted that the CPU and the GPU may be configured as separate processors. Further, the processor 81 is provided therein with one or more memories that temporarily store data. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication).

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to a stationary monitor or the like via the cradle.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

The main body apparatus 2 includes a power control section 97 and a battery 98. The power control section 97 is connected to the battery 98 and the processor 81. Further, although not shown, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

(Overview of Image Processing)

Next, image processing according to the exemplary embodiment is described. In a game system 1 (an example of an image processing system) according to the exemplary embodiment, a plurality of objects are placed in a three-dimensional virtual space, and a game is performed.

FIG. 3 is a diagram showing examples of a plurality of objects placed in a virtual space during the execution of a game according to the exemplary embodiment. If the game according to the exemplary embodiment is started, a three-dimensional virtual space defined by an xyz orthogonal coordinate system is set. For example, the y-axis is an axis in an up direction in the virtual space. The x-axis is an axis in a right direction in the virtual space. The z-axis is an axis in a depth direction in the virtual space.

As shown in FIG. 3, in the virtual space, a ground object 30 is placed as one of the plurality of objects. The ground object 30 is an object representing a ground, and for example, is a flat surface parallel to the xz plane. The ground object 30 may include depressions and protrusions, or may include a slope. On the ground object 30, a tree object 32 and a cylinder object 34 are placed. For example, a mountain object 36 is placed at a predetermined position in the z-axis direction in the virtual space. The ground object 30, the tree object 32, and the cylinder object 34 are fixed to the virtual space.

In the virtual space, character objects 41 and 43 are also placed. Each of the character objects 41 and 43 is an object having a flat shape and is a plate-like object of which the length in the thickness direction is smaller than the lengths in the up, down, left, and right directions. For example, each of the character objects 41 and 43 is a 3D object including a planar mesh forming a front surface and a planar mesh forming a back surface. The character object 41 is a player character controlled by a player. The character object 41 performs an action relating to an input to the controllers in the virtual space. For example, the character object 41 moves on the ground object 30, moves its hands and feet in the virtual space, jumps, or changes the direction of its face as an action. If the character object 41 moves in the left-right direction, the screen is scrolled in the left-right direction. The character object 43 is a non-player character that moves in accordance with the movement of the character object 41, and is automatically controlled by the processor 81. The character object 43 may be controlled by the player.

In the virtual space, a virtual camera is placed, a game image obtained by viewing the virtual space from the virtual camera is generated, and the generated game image is displayed on the display 12 or the stationary monitor (hereinafter, the display 12 or the stationary monitor will be referred to as a "display apparatus").

FIG. 4 is a diagram showing an example of the game image displayed on the display apparatus. The display apparatus displays images of the objects (30, 32, 34, 36, 41, and 43). For example, the ground object 30 is a reflection surface, and objects appear in a reflected manner on the ground object 30. In the exemplary embodiment, the reflected appearances of the objects are generated by a method termed SSR (screen space reflection).

For example, as shown in FIG. 4, on the ground object 30, a reflected appearance 52 of the tree object 32 and a reflected appearance 54 of the cylinder object 34 are displayed. On the ground object 30, a reflected appearance 61 of the character object 41 and a reflected appearance 63 of the character object 43 are also displayed. On the other hand, on the ground object 30, a reflected appearance of the mountain object 36 is not displayed.

In the exemplary embodiment, the tree object 32 and cylinder object 34 are set as particular objects in advance, and are set to appear in a reflected manner on the ground object even if the tree object 32 and the cylinder object 34 are somewhat away from the virtual camera. On the other hand, the mountain object 36 is not set as a particular object.

A particular object is set in mesh (an aggregate of polygons) units. For example, each of a plurality of meshes composing the tree object 32 may be set as a particular object. Alternatively, any of the plurality of meshes composing the tree object 32 may be set a particular object. For example, in a case where the tree object 32 includes a first mesh composing a trunk portion, and a second mesh composing a portion where leaves grow thick, only the first mesh between the first mesh and the second mesh may be set as a particular object. That is, a "particular object" does not necessarily need to be an object that appears to be a single object in appearance, and may be a mesh composing a part of an object that appears to be a single object in appearance. For example, a terrain object in which a ground parallel to the xz plane and a wall surface perpendicular to the xz plane are continuously formed looks as if forming a single terrain having a step in appearance. However, the ground and the wall surface may be composed of different meshes. The wall surface in this terrain object may be set as a particular object, and the ground in this terrain object may not be set as a particular object.

In the exemplary embodiment, the tree object 32 and the cylinder object 34 set as particular objects appear in a reflected manner on the ground object. A description is given below of image processing regarding the reflected appearances of these objects.

FIG. 5 is a diagram showing an overview of the image processing regarding the reflected appearances of the objects other than the character objects.

As shown in FIG. 5, first, the processor 81 performs a first depth test (step S1). Here, a depth test is performed in pixel units regarding all the objects (30, 32, 34, and 36) other than the character objects, and the result of the depth test is stored in a first depth buffer.

FIG. 6 is a diagram showing an example of the first depth buffer. As shown in FIG. 6, the first depth buffer stores the depth value of each pixel regarding all the objects (30, 32, 34, and 36) other than the character objects. Although an image of the objects is displayed in FIG. 6, this conceptually represents the depth value of each pixel stored in the first depth buffer. The position of each pixel is represented by coordinate values in a screen coordinate system. For example, an Sx axis in the screen coordinate system is an axis in a right direction in the image (the screen). An Sy axis in the screen coordinate system is an axis in an up direction in the image. For example, the origin of the screen coordinate system may be set at the center of the image, or may be set at the lower left of the image.

Referring back to FIG. 5, after step S1, the processor 81 performs rendering in a frame buffer based on the result of the first depth test (step S2). In step S2, an image is drawn in the frame buffer based on the depth stored in the first depth buffer. In the exemplary embodiment, deferred rendering (deferred shading) is used as the rendering method. In step S2, a normal buffer that stores normal information regarding each pixel is updated, and an image is drawn in the frame buffer. As the rendering method, forward rendering may be used instead of deferred rendering.

FIG. 7 is a diagram showing an example of an image drawn in the frame buffer after the rendering in step S2 is performed. As shown in FIG. 7, in step S2, images of all the objects (30, 32, 34, and 36) other than the character objects are drawn in the frame buffer. Color information is stored with respect to each pixel. For example, the color information includes RGB values indicating three colors and an alpha value indicating transparency (or opacity). Although shading is omitted in FIG. 7, an image with shading is generated in step S2.

Referring back to FIG. 5, after step S2, the processor 81 further performs a second depth test regarding particular objects among the plurality of objects placed in the virtual space (step S3). Specifically, the second depth test is further performed regarding the tree object 32 and the cylinder object 34 set as particular objects among the plurality of objects (30, 32, 34, and 36), and the result of the second depth test is stored in a second depth buffer. Consequently, the second depth buffer stores the depth value of each pixel of only the tree object 32 and the cylinder object 34 among the plurality of objects (30, 32, 34, and 36) included in the imaging range of the virtual camera.

FIG. 8 is a diagram showing an example of the second depth buffer. As shown in FIG. 8, the second depth buffer stores the depth value of each pixel of the tree object 32 and the cylinder object 34. On the other hand, the depth value of the mountain object 36 is not stored in the second depth buffer. FIG. 8 conceptually represents the depth value of each pixel stored in the second depth buffer.

Referring back to FIG. 5, after step S3, the processor 81 performs ray tracing using the first depth buffer or the second depth buffer (step S4). Here, a process is performed with respect to each pixel (hereinafter referred to as "pixel of interest"). Specifically, the processor 81 sets a pixel of interest, calculates the reflection position of a ray (a virtual light beam) when the ray is emitted in a direction from the position of the virtual camera to the pixel of interest, and makes a collision determination for determining whether or not the ray reflected from the reflection position collides with an object.

Next, the processor 81 calculates the color of a pixel in a frame buffer relating to the collision position of the ray as a color to appear in a reflected manner at the pixel of interest (step S5). The process of step S5 is also performed with respect to each pixel.

A specific description is given of the processes of steps S4 and S5 in a case where pixels PIXa to PIXc shown in FIG. 7 are set as pixels of interest.

For example, the processor 81 sets a pixel PIXa shown in FIG. 7 as a pixel of interest. The pixel PIXa is a pixel present further on the virtual camera side than the cylinder object 34. Based on the position in the screen coordinate system of the pixel of interest PIXa and the depth value of the position stored in the first depth buffer, the processor 81 calculates the position in the virtual space of the pixel of interest PIXa as a reflection position RPa of a ray.

FIG. 9 is a diagram showing the state where ray tracing is performed, and is a diagram showing the state where a ray reflected from the reflection position RPa collides with the cylinder object 34. The right direction in FIG. 9 is the depth direction of the screen when a game image generated based on a virtual camera VC is displayed on the screen.

As shown in FIG. 9, the processor 81 sets a direction from the position of the virtual camera VC to the reflection position RPa as an incidence direction and calculates the direction of a ray reflected from the reflection position RPa as a ray tracing direction RTDa. Specifically, based on the incidence direction and a normal to the reflection position RPa, the processor 81 calculates the reflection direction of the ray. The angle of incidence of the incidence direction and the angle of reflection of the reflection direction are equal to each other. Then, the processor 81 calculates the reflection direction or a direction obtained by correcting the reflection direction as the ray tracing direction RTDa. The correction of the reflection direction will be described below.

The processor 81 advances the ray in the ray tracing direction RTDa from the reflection position RPa and makes a collision determination for determining whether or not the ray collides with the object. If the tracing distance of the ray is less than La, the processor 81 makes the collision determination using the first depth buffer. Here, the tracing distance is the distance along the ray tracing direction from the reflection position.

FIG. 10 is a diagram showing the state where the collision determination regarding the ray reflected from the reflection position RPa is made using the first depth buffer. First, the processor 81 calculates the position in the virtual space obtained by advancing the ray by a maximum distance Lb in the ray tracing direction RTDa from the reflection position RPa in the virtual space and converts the calculated position into the screen coordinate system, thereby calculating a ray tracing end position in the screen coordinate system. The processor 81 sets the reflection position RPa (the pixel of interest PIXa) as a ray tracing start position in the screen coordinate system, extends the ray from the ray tracing start position to the ray tracing end position, and determines whether or not the end of the ray collides with the object. Specifically, the processor 81 advances the ray by a predetermined distance, and based on the depth of the end of the ray and the depth of each position stored in the first depth buffer, determines whether or not the ray collides with the object. In the example shown in FIGS. 9 and 10, it is determined that the ray reflected from the reflection position RPa collides with the object at a collision position CPa.

If it is determined that the ray collides with the object at the collision position CPa, in step S5, the color of a pixel in the frame buffer relating to the collision position CPa is calculated as a color to appear in a reflected manner at the pixel of interest RPa.

Next, a description is given of a case where a pixel PIXb shown in FIG. 7 is set as a pixel of interest and a case where a pixel PIXc shown in FIG. 7 is set as a pixel of interest. The pixel PIXb is a pixel present further on the virtual camera side than the tree object 32. The pixel PIXc is a pixel present further on the virtual camera side than the mountain object 36.

FIG. 11 is a diagram showing the state where ray tracing is performed, and is a diagram showing the state where a ray reflected from a reflection position RPb collides with the tree object 32. FIG. 12 is a diagram showing the state where ray tracing is performed, and is a diagram showing the state where a ray reflected from a reflection position RPc does not collide with an object. FIG. 13 is a diagram showing the state where a collision determination regarding a ray is made using the second depth buffer.

As shown in FIG. 11, if the pixel PIXb is set as a pixel of interest, similarly to the above, the processor 81 calculates the reflection position RPb relating to the pixel of interest PIXb and calculates the direction of a ray reflected from the reflection position RPb as a ray tracing direction RTDb. The processor 81 advances the ray in the ray tracing direction RTDb and makes a collision determination for determining whether or not the ray collides with the object. If the tracing distance is less than La, the processor 81 makes the collision determination regarding the ray using the first depth buffer. If the tracing distance is less than La, the ray does not collide with the object. Thus, the processor 81 further advances the ray and makes a collision determination regarding the ray using the second depth buffer (FIG. 13). As shown in FIGS. 11 and 13, if the tracing distance is greater than or equal to La and less than or equal to the maximum distance Lb, it is determined that the ray collides with the tree object 32 at a collision position CPb.

On the other hand, as shown in FIG. 12, if the pixel PIXc is set as a pixel of interest, similarly to the above, the processor 81 calculates the reflection position RPc relating to the pixel of interest PIXc, calculates the direction of a ray reflected from the reflection position RPc as a ray tracing direction RTDc, and advances the ray in the ray tracing direction RTDc. If the tracing distance is less than La, the processor 81 makes a collision determination regarding the ray using the first depth buffer. If the tracing distance is greater than or equal to La and less than or equal to the maximum distance Lb, the processor 81 makes a collision determination regarding the ray using the second depth buffer. Here, as shown in FIG. 13, the second depth buffer does not store the depth of the mountain object 36. Thus, as shown in FIGS. 12 and 13, the processor 81 determines that the ray does not collide with an object even if the ray is advanced to the maximum distance Lb.

Between a case where the collision position of a ray is calculated based on the first depth buffer and a case where the collision position of a ray is calculated based on the second depth buffer, a parameter for adding the color of a pixel at the collision position to the color of a pixel of interest may be varied. For example, the parameter may be changed so that the color of the reflected appearance is darker in a case where the collision position is calculated based on the second depth buffer than in a case where the collision position is calculated based on the first depth buffer.

The processes of the above steps S4 and S5 are performed regarding each pixel of interest, whereby a color to appear in a reflected manner at each pixel of interest is determined. Then, the determined color to appear in a reflected manner is added to the color of each pixel of interest, whereby the reflected appearances of the objects are drawn in the frame buffer.

Figure 14:
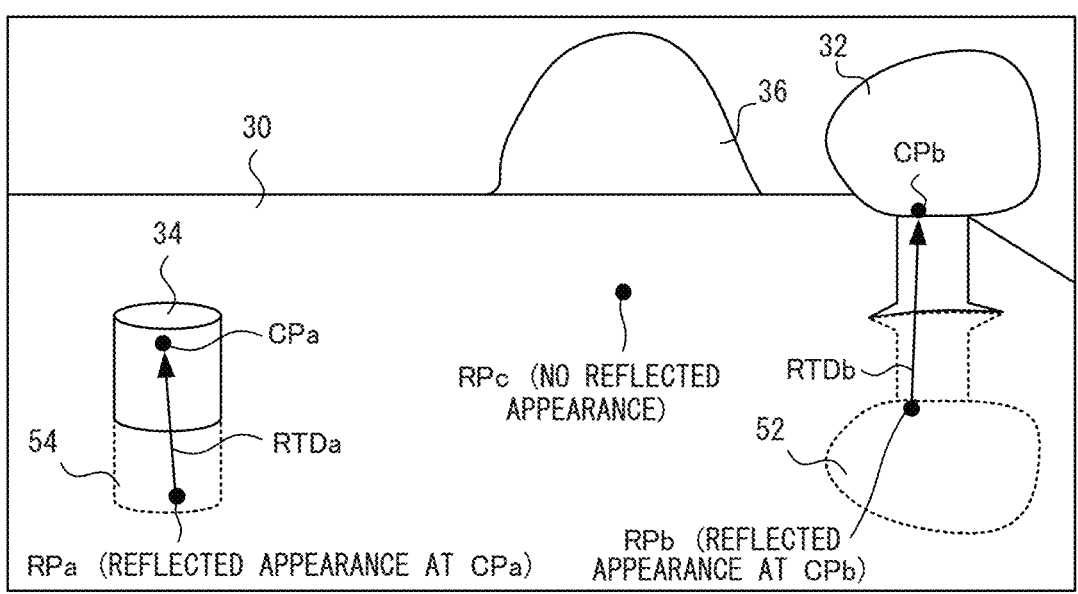
FIG. 14 is an example non-limiting diagram showing an example of an image drawn in the frame buffer when a color to appear in a reflected manner at each pixel is added.

FIG. 14 is a diagram showing an example of an image drawn in the frame buffer when a color to appear in a reflected manner at each pixel is added.

As shown in FIG. 14, the color of the pixel at the collision position CPa calculated as described above is added to the pixel RPa. A similar process is performed on each pixel included in an area on the near side of the cylinder object 34 (an area on the virtual camera side), whereby the reflected appearance 54 of the cylinder object 34 is drawn in the frame buffer. The color of the pixel at the collision position CPb is also added to the pixel RPb. A similar process is performed on each pixel included in an area on the near side of the tree object 32, whereby the reflected appearance 52 of the tree object 32 is drawn in the frame buffer. On the other hand, a collision position is not calculated regarding the pixel RPc. The same applies to a case where a process is performed on each pixel included in an area on the near side of the mountain object 36. Thus, the reflected appearance of the mountain object 36 is not drawn in the frame buffer.

As described above, in the exemplary embodiment, the result of performing the first depth test regarding the plurality of objects is stored in the first depth buffer, and the result of performing the second depth test regarding a particular object among the plurality of objects is stored in the second depth buffer. If the tracing distance is less than La, a collision determination regarding the ray is made based on the first depth buffer. If the tracing distance is greater than or equal to La and less than or equal to the maximum distance Lb, a collision determination regarding the ray is made based on the second depth buffer. Consequently, with the use of SSR, even if a particular object among the plurality of objects is away from the virtual camera, the reflected appearance of the particular object can be displayed, and the reflected appearance of the objects other than the particular object can be prevented from being displayed. An object that should appear in a reflected manner is specified as a particular object, whereby it is possible to cause a desired object to appear in a reflected manner, for example, on a ground. Conversely, an object that should not appear in a reflected manner is not specified as a particular object, whereby it is possible to prevent a desired object from appearing in a reflected manner.

Between a case where the collision position of a ray is calculated based on the first depth buffer and a case where the collision position of a ray is calculated based on the second depth buffer, a parameter for causing the color of a pixel at the collision position to appear in a reflected manner at a pixel of interest is varied. Consequently, for example, it is possible to cause a particular object to appear in a reflected manner more darkly and clearly.

(Correction of Reflection Direction)

Next, the correction of a reflection direction is described. As described above, a direction from the virtual camera VC to a reflection position is calculated as an incidence direction, and based on the incidence direction and a direction normal to the reflection position, a reflection direction is calculated. In the exemplary embodiment, if a correction condition is satisfied, a direction obtained by correcting the reflection direction is set as a ray tracing direction. If the correction condition is not satisfied, the reflection direction is set as the ray tracing direction. The correction condition for correcting the reflection direction and the correction method are specifically described below.

FIG. 15 is a diagram showing an example of the ray tracing direction obtained by correcting the reflection direction. As shown in FIG. 15, for example, in a case where ray tracing is performed regarding a pixel of interest (a reflection position RP1) close to the left end of the screen, a reflection direction RD1 calculated based on an incidence direction and a normal direction is corrected, and a direction after the correction is set as a ray tracing direction RTD1. Also in a case where ray tracing is performed regarding a pixel of interest (a reflection position RP2) present further on the right side of the screen than the reflection position RP1, a reflection direction RD2 is corrected, and a direction after the correction is set as a ray tracing direction RTD2.

A correction condition is satisfied in a case where both a condition regarding a reflection position and a condition regarding a reflection direction hold true. The condition regarding the reflection position is that the reflection position is in a predetermined range from an end of the screen. The condition regarding the reflection direction is that the reflection direction is directed outside of the screen. If one of the condition regarding the reflection position and the condition regarding the reflection direction does not hold true, the correction condition is not satisfied, and the reflection direction is not corrected. For example, if the reflection position is in the range from the left end of the screen to a quarter of the length in the left-right direction of the screen, and the reflection direction is directed in the left direction of the screen, the correction condition is satisfied. If the reflection position is in the range from the right end of the screen to a quarter of the length in the left-right direction of the screen, and the reflection direction is directed in the right direction of the screen, the correction condition is satisfied.

The correction level is greater at the reflection position RP1 close to the left end of the screen than at the reflection position RP2. Specifically, based on the position in the Sx axis direction in the screen coordinate system of the reflection position, a correction level CR is determined. The closer to the left end or the right end of the screen the position in the Sx axis direction of the reflection position is, the greater the correction level CR is. The greater the angle between the reflection direction in the screen coordinate system and the Sy axis direction is, the smaller the correction level CR is.

FIG. 16 is a diagram illustrating the details of the correction of a reflection direction. As shown in FIG. 16, for example, if the angle between a reflection direction RD and the up direction (the Sy axis direction) of the screen is less than or equal to 45 degrees, the correction level CR is set to a value CR (Sx) relating to the Sx coordinate value of a reflection position RP. For example, CR (Sx) is set in the range of 0 to 1. The closer to the left end or the right end of the screen the reflection position is, the greater the value CR (Sx) is. If the angle between the reflection direction RD and the up direction of the screen exceeds 45 degrees, the value CR (Sx) relating to the Sx coordinate value of the reflection position RP becomes small in accordance with the excess angle. If the angle between the reflection direction RD and the up direction of the screen exceeds a threshold (e.g., 60 degrees to 65 degrees), the correction level CR is set to "0".

In accordance with the correction level CR, a correction toward the inside of the screen is made in the reflection direction. Specifically, a position obtained by converting a position reached by the ray advancing by the maximum distance Lb in the reflection direction RD from the reflection position RP in the virtual space into the screen coordinate system is calculated as a ray tracing end position EP. The Sx coordinate value of the ray tracing end position EP is corrected to move in the direction of the inside of the screen in accordance with the correction level CR. For example, the Sx coordinate value of the ray tracing end position EP is corrected to come close to the Sx coordinate value of the reflection position RP by linear interpolation. For example, if the reflection position RP is located in a predetermined range from the left end of the screen, the ray tracing end position EP is moved in the right direction (the positive Sx axis direction) in accordance with the correction level CR. The Sx coordinate value of the ray tracing end position EP is not moved beyond the Sx coordinate value of the reflection position RP. The Sy coordinate value of the ray tracing end position EP does not change before and after the correction. Then, a direction from the reflection position EP to a ray tracing end position EP' after the movement is calculated as a ray tracing direction RTD.

As described above, in an area close to an end of the screen, a direction obtained by correcting a reflection direction is calculated as a ray tracing direction. Consequently, it is possible to generate a reflected appearance using SSR at the end of the screen. For example, as shown in FIG. 15, in a case where ray tracing is performed in the reflection direction RD1 regarding the pixel at the position RP1 present at the left end of the screen, the collision position of the ray may be outside the screen, and the color of a pixel at the collision position cannot be added to the pixel at the position RP1. Thus, if a reflection direction is not corrected, the color of a portion at an end of the screen may be a color different from that of another portion, and an image with discomfort may be obtained.

In the exemplary embodiment, a reflection direction based on an incidence direction and a normal direction is corrected, and the direction after the correction is set as a ray tracing direction. Thus, it is possible to make it easy to include the collision position of the ray within the screen and generate a reflected appearance based on a rendered image. The Sx coordinate value of the ray tracing end position EP is moved to come close to the Sx coordinate value of the reflection position RP. Thus, even if the maximum correction is made on a reflection direction toward the outside of the screen, the reflection direction does not become a direction toward the inside of the screen, and becomes the up direction of the screen. Thus, for example, at a pixel at a position at the left end of the screen, the color of a pixel to the right side of the pixel does not appear in a reflected manner. Consequently, it is possible to prevent an object from being unnaturally distorted and appearing in a reflected manner on a ground.

In the exemplary embodiment, the closer to the end of the screen the reflection position is, the greater the correction level is. Thus, even near the end of the screen, it is possible to generate a reflected appearance based on a pixel in the screen.

For example, in a case where a reflection direction is directed to the inside of the screen, and if the reflection direction is corrected, a reflected appearance far from an actual reflected appearance may be obtained. In the exemplary embodiment, if a reflection direction is not directed to the outside of the screen, the reflection direction is not corrected. Thus, it is possible to prevent a reflected appearance far from an actual reflected appearance from being generated.

If the angle between a reflection direction and the up direction of the screen is relatively great (e.g., exceeds 45 degrees), the correction level CR becomes small. If the angle between a reflection direction and the up direction of the screen exceeds a threshold, the correction level becomes 0. Consequently, for example, it is possible to prevent an unnatural reflected appearance from being generated because the correction level is too great in a case where a ground slopes. It is also possible to prevent the correction of a reflected appearance on a wall surface in which a reflection direction is a horizontal direction.

In the exemplary embodiment, a reflection direction is corrected regarding only a component in the left-right direction in the screen coordinate system. Thus, for example, the correction is suitable for a game where a virtual space spreads in the left-right direction of the screen, and the screen is scrolled in the horizontal direction.

(Generation of Reflected Appearances of Character Objects)

Figure 17:
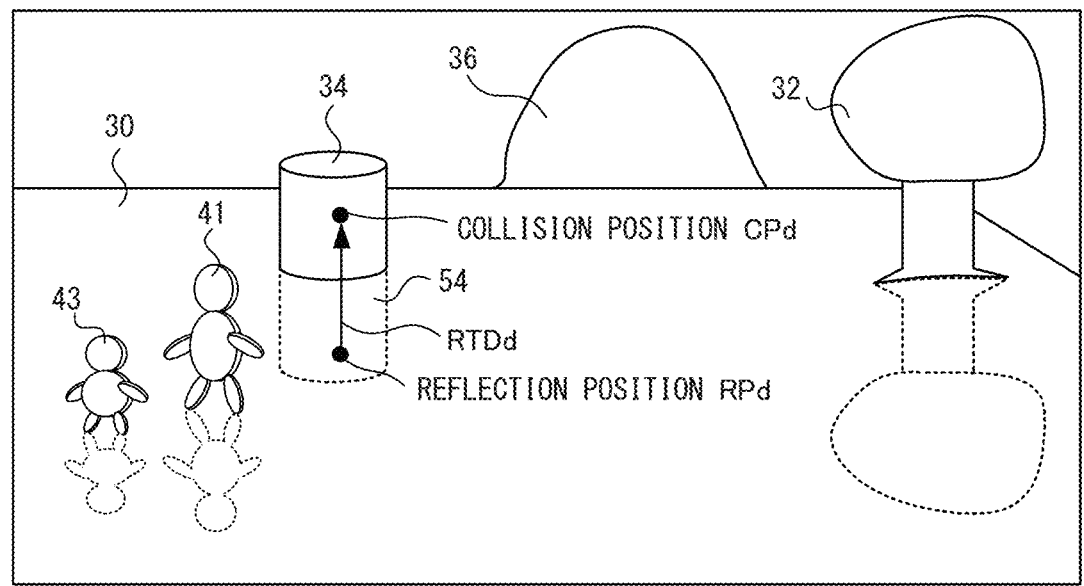
FIG. 17 is an example non-limiting diagram showing an example of a game image when a character object 41 is not present on the near side of the cylinder object 34.
Figure 18:
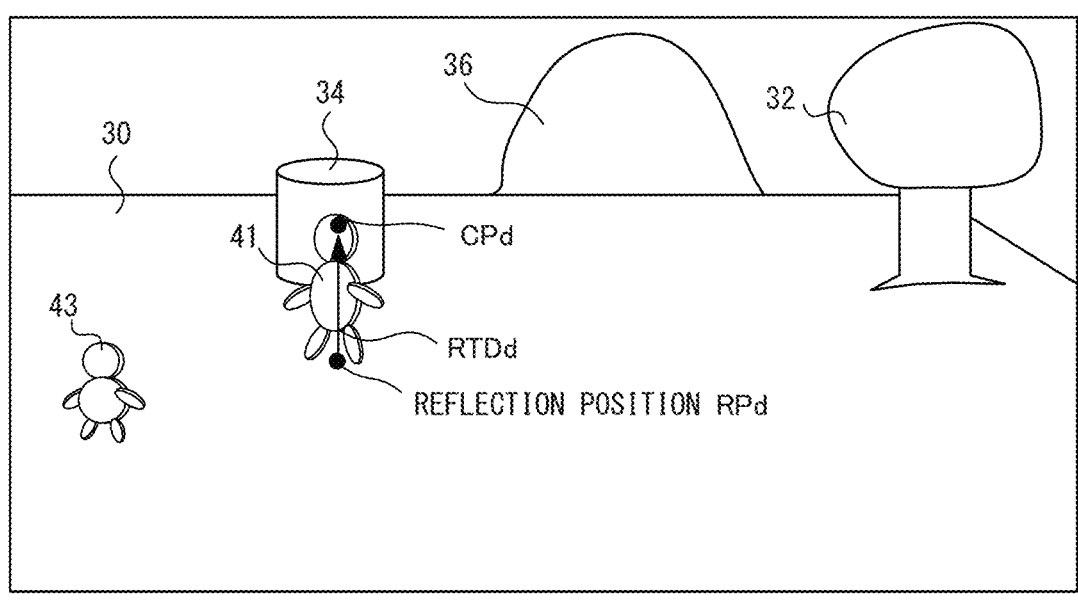
FIG. 18 is an example non-limiting diagram showing an example of a game image when the character object 41 is present on the near side of the cylinder object 34 after the character object 41 moves.

Next, a method for generating the reflected appearances of the character objects 41 and 43 is described. FIG. 17 is a diagram showing an example of a game image when the character object 41 is not present on the near side of the cylinder object 34. FIG. 18 is a diagram showing an example of a game image when the character object 41 is present on the near side of the cylinder object 34 after the character object 41 moves.

As shown in FIG. 17, if the character object 41 is not present on the near side of the cylinder object 34, for example, ray tracing is performed from a reflection position RPd on the near side, a collision position CPd is calculated, and the color of the collision position CPd is added to the color of the reflection position RPd. A similar process is performed on each pixel, whereby the reflected appearance 54 of the cylinder object 34 is displayed.

On the other hand, in FIG. 18, the character object 41 is present on the near side of the cylinder object 34, and the head of the character object 41 is present at the same position CPd as that in FIG. 17. In this case, the color of a pixel at the collision position CPd of the cylinder object 34 shown in FIG. 17 cannot be added to a pixel at the reflection position RPd, and a part of the cylinder object 34 does not appear in a reflected manner at the reflection position RPd. As described above, for example, when the character object 41 is located on the near side of the cylinder object 34, a natural reflected appearance relating to the proper positional relationship between the objects may not be able to be represented.

In the exemplary embodiment, to display the reflected appearances of a character object and an object present on the far side of the character object, image processing is performed by a method shown in FIG. 19. FIG. 19 is a diagram showing an overview of image processing for generating the reflected appearances of a character object and an object present on the far side of the character object.

As shown in FIG. 19, first, the processor 81 renders the objects other than the character objects (step S10). Here, the process of drawing the plurality of objects 30, 32, 34, and 36 placed in the virtual space in the frame buffer. The process of step S10 is the processes of steps S1 and S2 in FIG. 5.

Next, the processor 81 renders the character objects in another buffer and creates character flat surfaces in which the rendered images are set as textures (step S11).

FIG. 20 is a diagram showing an example of the character flat surfaces created in step S11. As shown in FIG. 20, the character object 41 is rendered in another buffer, and an image obtained by rendering the character object 41 is set as a texture on a two-dimensional flat surface object, whereby a character flat surface 65 is created. Similarly, a character flat surface 66 in which an image obtained by rendering the character object 43 is set as a texture is created. In the exemplary embodiment, an image obtained by rendering each character object is generated in each frame. An image obtained by rendering each character object may be prepared in advance. For example, an image relating to each action of the character object 41 may be stored in advance in a storage medium, and the character flat surface 65 in which the image stored in advance is set as a texture may be created.

Next, the processor 81 calculates the colors of the reflected appearances of the objects other than the character objects (step S12). Here, the colors of the reflected appearances of the plurality of objects 30, 32, 34, and 36 placed in the virtual space are calculated. Specifically, the processor 81 performs the processes of the above steps S3 to S5 in FIG. 5. At this time, the character objects are not drawn in the frame buffer, and therefore, even if a character object is present on the near side of an object when viewed from the virtual camera VC in the virtual space, the color of the reflected appearance of the object can be calculated. The calculated colors of the reflected appearances (hereinafter "a first reflected appearance color") of the objects other than the character objects are stored in a reflected appearance buffer. For example, the reflected appearance buffer stores RGB values and an alpha value as color information indicating the first reflected appearance color.

Next, the processor 81 calculates the colors of the reflected appearances of the character objects (step S13). Here, the processor 81 calculates the colors of the reflected appearances of the character objects when the character flat surfaces created in step S11 are placed in the virtual space.

FIG. 21 is a diagram illustrating the calculation of the colors of the reflected appearances of the character objects in step S13. As shown in FIG. 21, the processor 81 calculates the intersection position of the character flat surface 65 and a ray when the character flat surface 65 is placed in the virtual space in accordance with the position and the orientation of the character object 41 in the virtual space. Specifically, the processor 81 calculates the depth of the character flat surface 65 placed in the virtual space and calculates an intersection position CRPe of a ray traveling from a reflection position RPe to a ray tracing direction RTDe and the character flat surface 65. The color of a pixel at the intersection position CRPe is calculated as the color of the reflected appearance of the character object (hereinafter referred to as "a second reflected appearance color"). Here, in the character flat surface 65, a portion other than the image of the character object 41 is set to be transparent, and does not intersect a ray. For example, a ray traveling from a reflection position RPf to a ray tracing direction RTDf does not intersect the image of the character object 41 in the character flat surface 65. In this case, an intersection position is not calculated. The calculated second reflected appearance color is stored in the reflected appearance buffer. For example, the reflected appearance buffer stores RGB values and an alpha value as color information indicating the second reflected appearance color.

Referring back to FIG. 19, next, the processor 81 calculates a color to appear in a reflected manner at a pixel of interest based on the result of step S12 and the result of step S13 (step S14). For example, the second reflected appearance color is added to the first reflected appearance color, whereby a color to appear in a reflected manner at a pixel of interest is calculated. Here, "adding the second color to the first color" may mean the mixture of the two colors. For example, "adding the second color to the first color" may mean that alpha blending is performed using the first color as a background color and the second color as a foreground color. "Adding the second color to the first color" may mean that alpha blending is performed using the second color as a background color and the first color as a foreground color. "Adding the second color to the first color" may mean that the first color and the second color are mixed together based on the alpha values of the first color and the second color. "Adding the second color to the first color" may mean that the second color is painted over the first color by giving priority to the second color over the first color.

Next, the processor 81 renders the result of the calculation in step S14 in the frame buffer (step S15). Here, the processor 81 adds the calculated color to appear in a reflected manner in step S14 to the color of the pixel of interest stored in the frame buffer. For example, the processor 81 performs alpha blending using the color of the pixel of interest as a background color and the calculated color to appear in a reflected manner in step S14 as a foreground color. Consequently, the reflected appearances of the character objects and the objects other than the character objects are drawn in the frame buffer.

After the process of step S15 is performed, the processor 81 renders the character objects 41 and 43 in the frame buffer (step S16). Consequently, a game image as shown in FIG. 22 is generated and displayed on the display apparatus.

FIG. 22 is a diagram showing an example of the game image displayed in a case where the image processing in FIG. 19 is performed. As shown in FIG. 22, the tree object 32 and the reflected appearance 52 of the tree object 32 are displayed. The character object 43 and the reflected appearance 63 of the character object 43 are also displayed. The cylinder object 34 and the reflected appearance 54 of the cylinder object 34 are also displayed. On the near side of the cylinder object 34, the character object 41 is present, and the character object 41 and the reflected appearance 61 of the character object 41 are displayed. The reflected appearance 54 of the cylinder object 34 and the reflected appearance 61 of the character object 41 partially overlap each other, but both the reflected appearances 54 and 61 have shapes relating to the actual shapes and the positional relationship. Thus, natural reflected appearances can be represented.

In the exemplary embodiment, a character object is an object having a flat shape. As described above, in a case where the reflected appearance of the character object is generated based on a character flat surface in which an image of the character object is set as a texture, the reflected appearance of the character object looks planar. In a case where a character object itself is a three-dimensional object having some thickness, and if the reflected appearance looks planar, an image with discomfort may be obtained. In the exemplary embodiment, however, a character object itself is an object having a flat shape, and therefore, an image without discomfort can be obtained.

(Details of Image Processing)

Next, the details of the above image processing are described. First, data stored in a memory of the main body apparatus 2 (a memory in the processor 81, the DRAM 85, the flash memory 84, an external storage medium, or the like) is described. FIG. 23 is a diagram showing an example of data stored in the memory of the main body apparatus 2.

As shown in FIG. 23, the memory of the main body apparatus 2 stores a program, operation data, object data, character data, and character flat surface data. The memory of the main body apparatus 2 also stores the first depth buffer, the second depth buffer, the normal buffer, the reflected appearance buffer, and the frame buffer.

The program is a program for executing a main process described below and includes an image processing program for performing the above image processing regarding reflected appearances. The program is stored in advance in an external storage medium attached to the slot 23 or the flash memory 84 and is loaded into the DRAM 85 when the game is executed. The program may be acquired from another apparatus via a network (e.g., the Internet).

The operation data is data regarding operations acquired from the left controller 3 and the right controller 4. For example, the operation data is transmitted from the left controller 3 and the right controller 4 to the main body apparatus 2 at predetermined time intervals (e.g., $\frac{1}{200}$-second intervals) and stored in the memory.

The object data is data regarding the objects (30, 32, 34, and 36) other than the character objects placed in the virtual space. The object data includes data regarding the position and the orientation of each object in the virtual space, data regarding the shape of the object, and data regarding the texture of the object. The object data also includes information regarding whether or not each object is set as a particular object. For example, the tree object 32 and the cylinder object 34 are set as particular objects. On the other hand, the mountain object 36 is not set as a particular object.

The character data is data regarding the character objects 41 and 43. The character data includes data regarding the position and the orientation of each character object in the virtual space, data regarding the shape of the character object, and data regarding the texture of the character object. In the exemplary embodiment, each character object is formed as a 3D model, but is formed as a planar object thinner in the thickness direction than in the up, down, left, and right directions.

The character flat surface data is data regarding a flat surface object which is a two-dimensional object and in which an image obtained by rendering each character object is set as a texture. The character flat surface data includes data regarding the character flat surface 65 in which the image of the character object 41 is set as a texture, and data regarding the character flat surface 66 in which the image of the character object 43 is set as a texture.

The first depth buffer is a buffer that stores the depth value of each pixel generated and updated based on the result of the first depth test. The first depth buffer stores the depth values of all the objects other than the character objects included in the imaging range of the virtual camera VC.

The second depth buffer is a buffer that stores the depth value of each pixel generated and updated based on the result of the second depth test. The second depth buffer stores the depth value of a particular object included in the imaging range of the virtual camera VC.

The normal buffer is a buffer that stores normal information regarding each pixel.

The reflected appearance buffer is a buffer for storing the first reflected appearance color (the colors of the reflected appearances of the objects other than the character objects) and the second reflected appearance color (the colors of the reflected appearances of the character objects). The reflected appearance buffer stores the first reflected appearance color in a case where a ray collides with any of the objects other than the character objects in a ray tracing process described below, and stores the second reflected appearance color in a case where a ray and either of the character flat surfaces intersect each other. Although the details will be described below, the reflected appearance buffer may store a plurality of reflected appearance colors.

The frame buffer is a buffer that stores a game image to be displayed. An image stored in the frame buffer is output to the display apparatus at a predetermined timing and displayed on the display apparatus.

(Details of Game Processing in Main Body Apparatus 2)

Next, with reference to FIGS. 24 to 27, the details of processes performed by the main body apparatus 2 are described. FIG. 24 is a flow chart showing an example of a main process executed by the processor 81 of the main body apparatus 2. The processes shown in FIGS. 24 to 27 are performed by the CPUs or the GPUs of the processor 81.

As shown in FIG. 24, first, the processor 81 executes an initial process (step S100). Specifically, the processor 81 sets the three-dimensional virtual space and places the objects (30, 32, 34, and 36), the character objects (41 and 43), the virtual camera VC, a light source, and various other objects used in the game in the virtual space. After executing the initial process, the processor 81 repeatedly executes the processes of subsequent steps S101 to S108 at predetermined frame time intervals (e.g., $\frac{1}{60}$-second intervals).

In step S101, the processor 81 acquires the operation data from the controllers.

Next, the processor 81 performs game processing based on the acquired operation data (step S102). For example, based on the operation data, the processor 81 moves the character object 41 in the virtual space or causes the character object 41 to perform a predetermined action (e.g., a jump action, an attack action, or the like). In accordance with a predetermined algorithm, the processor 81 also moves the character object 43 in the virtual space or causes the character object 43 to perform a predetermined action. The processor 81 also controls an enemy object other than the character objects in the virtual space or moves an obstacle object as an obstacle to the character objects in the virtual space.

Next, the processor 81 performs a rendering process for rendering the objects other than the character objects (step S103). Specifically, the processor 81 performs the first depth test regarding each object other than the character objects 41 and 43 included in the imaging range of the virtual camera VC, thereby updating the first depth buffer. Based on the depth stored in the first depth buffer, the processor 81 also draws each object in the frame buffer. In the exemplary embodiment, deferred rendering is used as the rendering method. In step S103, the normal buffer is also updated. Forward rendering may be used as the rendering method.

Next, the processor 81 renders the character objects in another buffer and creates the character flat surfaces (step S104). Specifically, the processor 81 renders the character object 41 in another buffer and sets an image of the character object 41 rendered in the other buffer as a texture on a flat surface object, thereby creating the character flat surface 65. Similarly, the processor 81 creates the character flat surface 66 in which an image of the character object 43 is set as a texture on a flat surface object.

After step S104, the processor 81 performs an SSR process (step S105). The SSR process is a process for drawing the reflected appearances of all the objects including the character objects in the frame buffer. The details of the SSR process are described below.

(SSR Process)

FIG. 25 is a flow chart showing an example of the SSR process in step S105.

As shown in FIG. 25, the processor 81 performs the second depth test on particular objects, thereby updating the second depth buffer (step S121). For example, the processor 81 performs the depth test on the tree object 32 and the cylinder object 34 set as particular objects in advance, thereby updating the second depth buffer. The particular objects are set in mesh units.

Next, the processor 81 performs a ray tracing process (step S122). The ray tracing process is performed on each pixel of interest. Here, the color of the reflected appearance at each pixel of interest is calculated. The ray tracing process may be performed regarding all the pixels, or may be performed regarding only pixels in a particular range. For example, a load may be reduced by excluding a portion where a model is not drawn, a portion where SSR is set to disabled in model or mesh units, a portion where a normal direction is outside a particular range, or the like. The details of the ray tracing process are described below.

(Ray Tracing Process)

FIG. 26 is a flow chart showing an example of the ray tracing process in step S122.

As shown in FIG. 26, the processor 81 calculates the position in the virtual space of the pixel of interest as a reflection position and calculates a reflection direction (step S131). Specifically, based on the position in the screen coordinate system of the pixel of interest and the depth of the pixel of interest stored in the first depth buffer, the processor 81 calculates the position in the virtual space of the pixel of interest as a reflection position. The processor 81 sets a direction from the position of the virtual camera VC to the reflection position as an incidence direction, and calculates a reflection direction based on the incidence direction and a direction normal to the reflection position.

Next, the processor 81 sets the calculated reflection direction or a direction obtained by correcting the reflection direction as a ray tracing direction (step S132). Here, if the correction condition is satisfied, the direction obtained by correcting the reflection direction is set as the ray tracing direction. If the correction condition is not satisfied, the reflection direction is set as the ray tracing direction. A ray tracing end position is also set. The correction condition and the correction method are as described above.

After step S132, the processor 81 sets the first depth buffer as a determination depth buffer and starts ray tracing from the pixel of interest (step S133). The ray tracing is performed in the screen coordinate system. Next, the processor 81 advances a ray by a predetermined distance (step S134).

Subsequently, the processor 81 determines whether or not the tracing distance exceeds the maximum distance Lb (step S135). Specifically, the processor 81 determines whether or not the end of the ray in the screen coordinate system reaches the ray tracing end position.

If it is determined that the tracing distance exceeds Lb (step S135: YES), the processor 81 performs the process of step S141 next.

If, on the other hand, the tracing distance is less than or equal to Lb (step S135: NO), the processor 81 determines whether or not the ray collides with an object (step S136). Specifically, using the determination depth buffer, the processor 81 determines whether or not the end of the ray collides with an object.

If it is determined that the ray does not collide with an object (step S136: NO), the processor 81 determines whether or not the tracing distance is greater than or equal to La (step S137).

If the tracing distance is greater than or equal to La (step S137: YES), the processor 81 changes the determination depth buffer to the second depth buffer (step S138) and executes the process of step S134 again. If, on the other hand, the tracing distance is less than La (step S137: NO), the processor 81 executes the process of step S134 again while maintaining the determination depth buffer.

If, on the other hand, it is determined that the ray collides with an object (step S136: YES), the processor 81 calculates the first reflected appearance color based on the color of the collision position of the ray (step S139). For example, the processor 81 may calculate the color of a pixel at the collision position stored in the frame buffer as the first reflected appearance color, or may calculate a color obtained by performing a predetermined process on the color of the pixel at the collision position as the first reflected appearance color. The first reflected appearance color differs between a case where it is determined that the ray collides with an object based on the first depth buffer and a case where it is determined that the ray collides with an object based on the second depth buffer. For example, in a case where the first depth buffer is set as the determination depth buffer, the color of the pixel at the collision position may be changed to be light (the alpha value may be made small) in accordance with the tracing distance, and the changed color may be calculated as the first reflected appearance color. In a case where the second depth buffer is set as the determination depth buffer, the color of the pixel at the collision position may be calculated as the first reflected appearance color, regardless of the tracing distance. In a case where the second depth buffer is set as the determination depth buffer, the color of the pixel at the collision position may be changed to be light in accordance with the tracing distance, but the color of the pixel at the collision position may be changed to be darker than in a case where the first depth buffer is set as the determination depth buffer, and the changed color may be calculated as the first reflected appearance color. Then, the processor 81 stores the calculated first reflected appearance color in the reflected appearance buffer. Here, the first reflected appearance color stored in the reflected appearance buffer in a case where it is determined that the ray collides with an object based on the first depth buffer is referred to as "the first reflected appearance color (the first depth buffer)". The first reflected appearance color stored in the reflected appearance buffer in a case where it is determined that the ray collides with an object based on the second depth buffer is referred to as "the first reflected appearance color (the second depth buffer)".

Next, the processor 81 determines whether or not the determination depth buffer is the first depth buffer and the first reflected appearance color calculated in step S139 is translucent (step S140). For example, if the tracing distance is less than or equal to La and the first reflected appearance color is translucent, the ray tracing is performed further on the far side. That the first reflected appearance color is translucent means that the alpha value of the reflected appearance is less than 1.0. The alpha value, however, is independently calculated based on the distance La, the collision position, and various other parameters.

If the determination is NO in step S140, the processing of the processor 81 proceeds to step S141. If the determination is YES in step S140, the processing of the processor 81 proceeds to step S138.

In step S141, the processor 81 calculates the colors of the reflected appearances of the character objects (the second reflected appearance color). The details of the process of step S141 are described below.

FIG. 27 is a flow chart showing an example of the calculation process for calculating the colors of the reflected appearances of the character objects in step S141.

As shown in FIG. 27, the processor 81 calculates the intersection position of the ray and each character flat surface (step S151). Specifically, the processor 81 calculates the depth of the character flat surface placed in accordance with the position and the orientation of the character object in the virtual space and determines whether or not the ray used in the ray tracing and the character flat surface intersect each other. If the ray and the character flat surface intersect each other, the processor 81 calculates the intersection position.

Next, the processor 81 stores the color of the intersection position as the second reflected appearance color in the reflected appearance buffer (step S152). Specifically, the processor 81 stores the color based on the color of a pixel of the texture image of the character object relating to the intersection position as the second reflected appearance color. The second reflected appearance color may be the color of a pixel of the texture image of the character object, or may be a color calculated by performing a predetermined process on the color of the pixel. If the process of step S152 is performed, the processor 81 ends the process shown in FIG. 27, and the processing returns to FIG. 26. If the ray intersects a plurality of character flat surfaces, a plurality of second reflected appearance colors are stored in the reflected appearance buffer. In this case, the plurality of second reflected appearance colors may be stored in the reflected appearance buffer in ascending order of the distance from the intersection position to the virtual camera.

The processes of steps S139 and S152 are performed, whereby the reflected appearance buffer stores 0 to a plurality of reflected appearance colors. For example, the reflected appearance buffer may store reflected appearance colors relating to the collision positions or the intersection positions of the ray in ascending order of the distance to the virtual camera. For example, in a case where it is determined that the ray collides with an object at a first position where the tracing distance is less than is La, and it is determined that the ray collides with an object at a second position where the tracing distance is greater than or equal to La and less than Lb, and if the ray intersects a character flat surface between the first position and the second position, the reflected appearance buffer stores the first reflected appearance color (the first depth buffer), the second reflected appearance color, and the first reflected appearance color (the second depth buffer) in ascending order of the distance to the virtual camera (see FIG. 23). If the ray does not collide with any of the objects and does not intersect a character flat surface, the reflected appearance buffer does not store a reflected appearance color.

Referring back to FIG. 26, after the process of step S141, the processor 81 calculates a color to appear in a reflected manner at the pixel of interest based on the reflected appearance color stored in the reflected appearance buffer (step S142). If a plurality of reflected appearance colors are stored in the reflected appearance buffer, the processor 81 may calculate the color to appear in a reflected manner at the pixel of interest by alpha-blending the plurality of reflected appearance colors in descending order of the distance to the virtual camera. For example, as shown in FIG. 23, if the reflected appearance buffer stores the first reflected appearance color (the first depth buffer), the second reflected appearance color, and the first reflected appearance color (the second depth buffer) in ascending order of the distance to the virtual camera, the processor 81 may calculate the color to appear in a reflected manner at the pixel of interest by calculating a color obtained by alpha-blending the first reflected appearance color (the second depth buffer) with the second reflected appearance color and further alpha-blending the calculated color with the first reflected appearance color (the first depth buffer). For example, if the reflected appearance buffer stores the second reflected appearance color and the first reflected appearance color in ascending order of the distance to the virtual camera (i.e., if an object is not present on the near side of a character object and an object is present on the far side of the character object when viewed from the virtual camera), the processor 81 may calculate the color to appear in a reflected manner at the pixel of interest by alpha-blending the first reflected appearance color with the second reflected appearance color. For example, if the second reflected appearance color on the near side is opaque, the second reflected appearance color is set as the color to appear in a reflected manner at the pixel of interest. If the second reflected appearance color on the near side is translucent, a color obtained by blending the first reflected appearance color and the second reflected appearance color is calculated as the color to appear in a reflected manner at the pixel of interest. The processor 81 stores the calculated color to appear in a reflected manner in the memory.

If the process of step S142 is performed, the process of the processor 81 in FIG. 26 ends, and the processing returns to FIG. 25.

Referring back to FIG. 25, after step S122, the processor 81 performs rendering in the frame buffer based on the result of the ray tracing process (step S123). For example, the processor 81 adds the color to appear in a reflected manner calculated in step S142 to the color of the pixel of interest stored in the frame buffer. Consequently, the color to appear in a reflected manner calculated in step S142 is reflected on the color of the pixel of interest.

Next, the processor 81 determines whether or not the processes of steps S122 and S123 are performed regarding all the pixels (step S124). If the determination of the processor 81 is NO in step S124, the processor 81 executes the process of step S122 again. The processes of steps S122 and S123 are performed regarding all the pixels, whereby the reflected appearances (52 and 54) of the objects other than the character objects placed in the virtual space and the reflected appearances (61 and 63) of the character objects are drawn in the frame buffer. If the determination of the processor 81 is YES in step S124, the process in FIG. 25 ends, and the processing returns to FIG. 24.

Referring back to FIG. 24, after step S105, the processor 81 further renders the character objects 41 and 43 in the frame buffer (step S106).

Next, the processor 81 outputs an image stored in the frame buffer to the display apparatus (step S107). Consequently, a game image is displayed.

Next, the processor 81 determines whether or not to end the game (step S108). For example, if an instruction to end the game is given by the player, the processor 81 ends the game processing shown in FIG. 24. If it is determined that the game is not to be ended (step S108: NO), the processor 81 executes the process of step S101 again. This is the description of the main process shown in FIG. 24.

The order, the contents, the values used in the determinations, and the like of the processes in the above flow charts are merely examples, and may be appropriately changed.

As described above, in the exemplary embodiment, if the tracing distance is less than La, the collision determination regarding the ray is made based on the first depth buffer. If the tracing distance is greater than or equal to La, the collision determination regarding the ray is made based on the second depth buffer (steps S135 to S140). Consequently, even if the tracing distance is long regarding a particular object, it is possible to display the reflected appearance of the particular object. It is possible to prevent the reflected appearance of an object other than the particular object from being displayed. Thus, it is possible to cause a desired object to appear in a reflected manner or not to appear in a reflected manner. In a case where a reflected appearance is generated based on the first depth buffer and the second depth buffer, and the reflected appearance is based on the first depth buffer, the color of the reflected appearance is made light in accordance with the tracing distance, whereby it is possible to cause a particular object appear large and clear in a reflected manner, and cause an object other than the particular object to appear small in a reflected manner.

In the exemplary embodiment, if a pixel of interest (a reflection position) is close to an end of the screen, a direction obtained by correcting a reflection direction based on an incidence direction and a direction normal to the reflection position is set as a ray tracing direction (step S132). Consequently, it is possible to calculate a reflected appearance color based on a pixel drawn in the frame buffer. Thus, it is possible to generate a reflected appearance even at an end of the screen.

In the exemplary embodiment, an object other than a character object is drawn in the frame buffer first, the reflected appearance of the object is drawn, the reflected appearance of the character object is further drawn, and the character object is drawn last. Consequently, it is possible to display the reflected appearance of an object present on the far side of a character object when viewed from the virtual camera and also display the reflected appearance of the character object.

In the exemplary embodiment, the color of a collision position calculated based on the first depth buffer, the color of a collision position calculated based on the second depth buffer, and the color of an intersection position of a character flat surface are calculated, and these colors are alpha-blended in order from the far side. Consequently, even if objects overlap each other when viewed from the virtual camera, it is possible to display the reflected appearances of the objects.

(Variations)

While the image processing according to the exemplary embodiment has been described above, the exemplary embodiment is merely an example and may be modified as follows, for example.

For example, although in the above exemplary embodiment, deferred rendering is used as the rendering method, in another exemplary embodiment, forward rendering may be used. In a case where forward rendering is used, in the above SSR process, for example, a direction normal to a reflection position relating to a pixel of interest may be estimated based on the depths of a plurality of pixels around the pixel of interest, and a reflection direction may be calculated based on an incidence direction and the normal direction. Alternatively, the orientation of a mesh in the virtual space may be calculated, a direction normal to a reflection position relating to the pixel of interest may be calculated, and a reflection direction may be calculated based on the normal direction.

Although in the above exemplary embodiment, a reflection direction regarding a pixel in an area in a predetermined range from the left end or the right end of the screen is corrected, in another exemplary embodiment, a reflection direction regarding a pixel in an area in a predetermined range from the upper end or the lower end of the screen may also be corrected. In the above exemplary embodiment, in the correction of a reflection direction, the position in the Sx axis direction of a ray tracing end position in the screen coordinate system is brought close to the position in the Sx axis direction of a reflection position. In another exemplary embodiment, a reflection direction may be corrected by also moving the position in the Sy axis direction of a ray tracing end position in the positive or negative Sy axis direction. A reflection direction may be corrected by moving a ray tracing end position in the horizontal direction and/or the vertical direction so that the collision position of the ray is included in the screen.

Although in the above exemplary embodiment, ray tracing is performed in the screen coordinate system, in another exemplary embodiment, ray tracing may be performed in an xyz coordinate system of the virtual space. That is, in the xyz coordinate system of the virtual space, a ray may be extended, the collision position of the ray may be calculated, and the color of a pixel at a position relating to the collision position may be calculated as a reflected appearance color.

In the above exemplary embodiment, a character flat surface in which an image of a character object is set as a texture on a flat surface object is created, and the color of the reflected appearance of the character object is calculated using the character flat surface. In another exemplary embodiment, an image of a character object may be set as a texture on a three-dimensional object, and the color of the reflected appearance of the character object may be calculated using the three-dimensional object. Although in the above exemplary embodiment, a character object is an object having a flat shape, in another exemplary embodiment, a character object may be an object having a three-dimensional shape with thickness.

Although in the above exemplary embodiment, a case has been described where an object appears in a reflected manner on a ground as a reflection surface, an object may be caused to appear in a reflected manner on a surface (e.g., a wall surface or a ceiling surface) other than a ground as a reflection surface by the above processing.

Although in the above exemplary embodiment, a game image is generated, the above image processing may be used to generate not only a game image but also any image.

The configuration of the hardware is merely an example, and the above image processing may be performed by any other hardware. For example, the above processing may be executed by any information processing apparatus such as a personal computer, a tablet terminal, a smartphone, or a server on the Internet. The above image processing may be executed in an information processing system including a plurality of apparatuses. The plurality of apparatuses may execute the above image processing in a dispersed manner. An apparatus that performs the above image processing and an apparatus that displays an image may be different from each other. For example, a first apparatus (e.g., a server) may generate an image by executing a part or all of the above image processing and transmit the generated image to a second apparatus via a network (e.g., the Internet or a LAN), and the second apparatus may display the image.

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. One or more non-transitory computer-readable media having stored therein instructions that, when executed, cause one or more processors of an information processing apparatus to execute image processing comprising:

regarding objects in a virtual space, performing a first depth test using a first depth buffer and updating the first depth buffer; and performing drawing in a frame buffer based on a result of the first depth test;

with respect to each pixel of the frame buffer in which the drawing is performed, using the pixel as a pixel of interest, based on a depth of the first depth buffer, calculating a direction from a virtual camera to a position in the virtual space relating to the pixel of interest as an incidence direction, and calculating as a ray tracing direction a direction obtained by, with the position as a reflection position, further making a correction toward an inside of a screen in a reflection direction based on the incidence direction and a direction normal to the reflection position;

tracing a ray along the ray tracing direction, and based on the first depth buffer, determining a collision position where the ray collides with an object in the virtual space; and if the collision position is determined in a range where the tracing distance of the ray is less than or equal to a first distance, determining a color based on a color of a pixel in the frame buffer relating to the collision position as a reflected appearance color to be added to a color of the pixel of interest.

2. The one or more non-transitory computer-readable media according to claim 1, wherein the correction is a correction for, with a position at a second distance in the ray tracing direction from the reflection position as a terminal position, moving screen coordinates of the terminal position toward the inside of the screen.

3. The one or more non-transitory computer-readable media according to claim 2, wherein the second distance is the first distance.

4. The one or more non-transitory computer-readable media according to claim 2, wherein the correction is a correction for moving the screen coordinates of the terminal position close to screen coordinates of the reflection position at a level.

5. The one or more non-transitory computer-readable media according to claim 4, wherein the closer to an end of the screen the screen coordinates of the reflection position are, the higher the level is.

6. The one or more non-transitory computer-readable media according to claim 4, wherein the correction is a correction made only if the screen coordinates of the reflection position are included in a predetermined range close to an end of the screen.

7. The one or more non-transitory computer-readable media according to claim 4, wherein the correction is a correction made only if the reflection direction is directed to an outside of the screen.

8. The one or more non-transitory computer-readable media according to claim 2, wherein the correction is made regarding only a component in a left-right direction of the screen coordinates.

9. An information processing system comprising: one or more processors that execute image processing comprising:

regarding objects in a virtual space, performing a first depth test using a first depth buffer and updating the first depth buffer; and performing drawing in a frame buffer based on a result of the first depth test;

with respect to each pixel of the frame buffer in which the drawing is performed, using the pixel as a pixel of interest, based on a depth of the first depth buffer, calculating a direction from a virtual camera to a position in the virtual space relating to the pixel of interest as an incidence direction, and calculating as a ray tracing direction a direction obtained by, with the position as a reflection position, further making a correction toward an inside of a screen in a reflection direction based on the incidence direction and a direction normal to the reflection position;

tracing a ray along the ray tracing direction, and based on the first depth buffer, determining a collision position where the ray collides with an object in the virtual space; and if the collision position is determined in a range where the tracing distance of the ray is less than or equal to a first distance, determining a color based on a color of a pixel in the frame buffer relating to the collision position as a reflected appearance color to be added to a color of the pixel of interest.

10. The image processing system according to claim 9, wherein the correction is a correction for, with a position at a second distance in the ray tracing direction from the reflection position as a terminal position, moving screen coordinates of the terminal position toward the inside of the screen.

11. The image processing system according to claim 10, wherein the second distance is the first distance.

12. The image processing system according to claim 10, wherein the correction is a correction for moving the screen coordinates of the terminal position close to screen coordinates of the reflection position at a level.

13. The image processing system according to claim 12, wherein the closer to an end of the screen the screen coordinates of the reflection position are, the higher the level is.

14. The image processing system according to claim 12, wherein the correction is a correction made only if the screen coordinates of the reflection position are included in a predetermined range close to an end of the screen.

15. The image processing system according to claim 12, wherein the correction is a correction made only if the reflection direction is directed to an outside of the screen.

16. The image processing system according to claim 10, wherein the correction is made regarding only a component in a left-right direction of the screen coordinates.

17. An image processing method comprising:

regarding objects in a virtual space, performing a first depth test using a first depth buffer and updating the first depth buffer; and performing drawing in a frame buffer based on a result of the first depth test;

with respect to each pixel of the frame buffer in which the drawing is performed, using the pixel as a pixel of interest, based on a depth of the first depth buffer, calculating a direction from a virtual camera to a position in the virtual space relating to the pixel of interest as an incidence direction, and calculating as a ray tracing direction a direction obtained by, with the position as a reflection position, further making a correction toward an inside of a screen in a reflection direction based on the incidence direction and a direction normal to the reflection position;

tracing a ray along the ray tracing direction, and based on the first depth buffer, determining a collision position where the ray collides with an object in the virtual space; and if the collision position is determined in a range where the tracing distance of the ray is less than or equal to a first distance, determining a color based on a color of a pixel in the frame buffer relating to the collision position as a reflected appearance color to be added to a color of the pixel of interest.

18. The image processing method according to claim 17, wherein the correction is a correction for, with a position at a second distance in the ray tracing direction from the reflection position as a terminal position, moving screen coordinates of the terminal position toward the inside of the screen.

19. The image processing method according to claim 18, wherein the second distance is the first distance.

20. The image processing method according to claim 18, wherein the correction is a correction for moving the screen coordinates of the terminal position close to screen coordinates of the reflection position at a level.

21. The image processing method according to claim 20, wherein the closer to an end of the screen the screen coordinates of the reflection position are, the higher the level is.

22. The image processing method according to claim 20, wherein the correction is a correction made only if the screen coordinates of the reflection position are included in a predetermined range close to an end of the screen.

23. The image processing method according to claim 20, wherein the correction is a correction made only if the reflection direction is directed to an outside of the screen.

24. The image processing method according to claim 18, wherein the correction is made regarding only a component in a left-right direction of the screen coordinates.

25. An information processing apparatus comprising: one or more processors that execute image processing comprising:

regarding objects in a virtual space, performing a first depth test using a first depth buffer and updating the first depth buffer; and performing drawing in a frame buffer based on a result of the first depth test;

with respect to each pixel of the frame buffer in which the drawing is performed, using the pixel as a pixel of interest, based on a depth of the first depth buffer, calculating a direction from a virtual camera to a position in the virtual space relating to the pixel of interest as an incidence direction, and calculating as a ray tracing direction a direction obtained by, with the position as a reflection position, further making a correction toward an inside of a screen in a reflection direction based on the incidence direction and a direction normal to the reflection position;

tracing a ray along the ray tracing direction, and based on the first depth buffer, determining a collision position where the ray collides with an object in the virtual space; and if the collision position is determined in a range where the tracing distance of the ray is less than or equal to a first distance, determining a color based on a color of a pixel in the frame buffer relating to the collision position as a reflected appearance color to be added to a color of the pixel of interest.

* * * * *